US012561437B2

(12) United States Patent
Bednash et al.

(10) Patent No.: US 12,561,437 B2
(45) Date of Patent: Feb. 24, 2026

(54) CYBERSECURITY ACTIVE DEFENSE AND RAPID BULK RECOVERY IN A DATA STORAGE SYSTEM

(71) Applicant: RackTop Systems, Inc., Fulton, MD (US)

(72) Inventors: Eric Bednash, Fulton, MD (US); Jonathan Halstuch, Fulton, MD (US); Nicholas Louis Mezei, Catonsville, MD (US); Garrett Porter, Highland, MD (US); Gerald Jelinek, Colorado Springs, CO (US); Garrett Eugene D'Amore, San Marcos, CA (US)

(73) Assignee: RackTop Systems, Inc., Fulton, MD (US)

( * ) Notice: Subject to any disclaimer, the term of this patent is extended or adjusted under 35 U.S.C. 154(b) by 78 days.

(21) Appl. No.: 18/489,778

(22) Filed: Oct. 18, 2023

(65) Prior Publication Data

US 2024/0045964 A1 Feb. 8, 2024

Related U.S. Application Data

(63) Continuation-in-part of application No. 17/521,676, filed on Nov. 8, 2021, now Pat. No. 11,868,495.

(60) Provisional application No. 63/113,697, filed on Nov. 13, 2020.

(51) Int. Cl.
| | |
|---|---|
| *G06F 21/62* | (2013.01) |
| *G06F 11/1446* | (2026.01) |
| *G06F 21/55* | (2013.01) |
| *G06F 21/56* | (2013.01) |

(52) U.S. Cl.
CPC ........ *G06F 21/566* (2013.01); *G06F 11/1451* (2013.01)

(58) Field of Classification Search
CPC .. G06F 21/566; G06F 11/1451; G06F 21/554; G06F 21/6218
See application file for complete search history.

(56) References Cited

U.S. PATENT DOCUMENTS

| | | | |
|---|---|---|---|
| 11,032,301 B2 | 6/2021 | Mandrychenko et al. | |
| 11,409,868 B2 | 8/2022 | Reid et al. | |
| 11,716,342 B2 * | 8/2023 | Weingarten | H04L 63/1441 |
| | | | 726/23 |
| 11,868,495 B2 | 1/2024 | Bednash et al. | |

(Continued)

*Primary Examiner* — Quazi Farooqui
(74) *Attorney, Agent, or Firm* — Carr & Ferrell LLP

(57) ABSTRACT

Cybersecurity active defense and rapid bulk recovery in data storage systems are disclosed herein. An example system includes a file system, and an architecture installed on the file system, the architecture being configured to protect the file system in a zero trust manner from a malicious attack by a source system, the architecture including a controller that is configured to determine file-level operations of files in the file system that are indicative of a malicious event, block a user account or machine address interacting with the files, prevent data exfiltration or data corruption of the files, provide an alert regarding the files, identify the files that were associated with the malicious event, generate recommendations regarding the files based on datapoints and the file-level operations on the files, present a graphical user interface that displays the recommendations, and remove and restore the one or more of the files as requested.

19 Claims, 20 Drawing Sheets

(56)         References Cited

U.S. PATENT DOCUMENTS

| 2012/0197941 A1 | 8/2012 | Metzger |
| 2013/0160126 A1* | 6/2013 | Kapoor ................. G06F 21/568 |
| | | 726/24 |
| 2016/0094570 A1 | 3/2016 | Hunt et al. |
| 2017/0372232 A1* | 12/2017 | Maughan ............. G06F 3/0482 |
| 2018/0101678 A1 | 4/2018 | Rosa |
| 2018/0159929 A1 | 6/2018 | Heckle |
| 2019/0258782 A1 | 8/2019 | Lerner |
| 2019/0260781 A1 | 8/2019 | Fellows et al. |
| 2022/0131879 A1* | 4/2022 | Naik ................... H04L 63/1416 |
| 2022/0156396 A1 | 5/2022 | Bednash et al. |

* cited by examiner

800

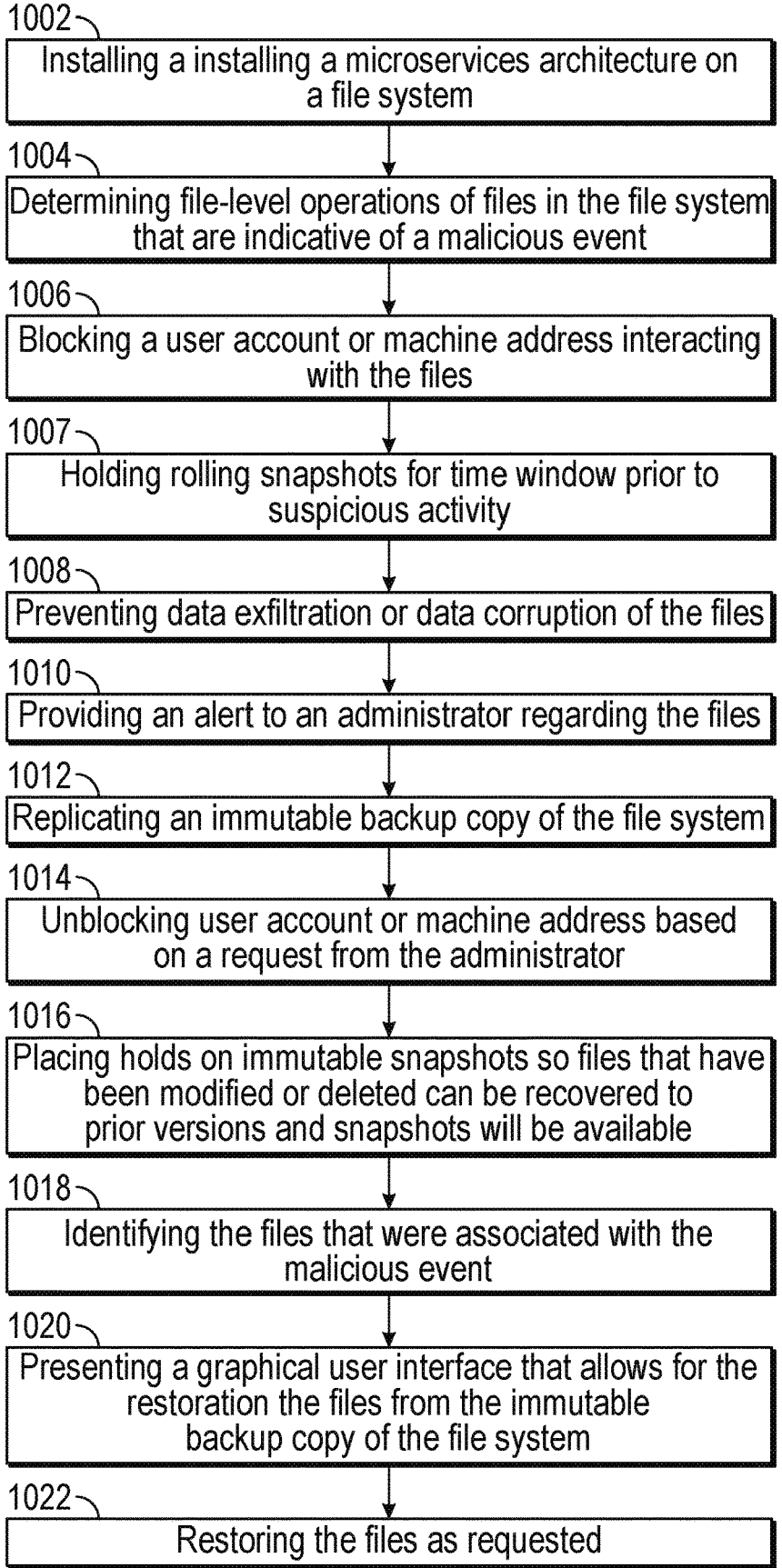

1002
Installing a installing a microservices architecture on a file system

1004
Determining file-level operations of files in the file system that are indicative of a malicious event 1006
Blocking a user account or machine address interacting with the files 1007
Holding rolling snapshots for time window prior to suspicious activity 1008
Preventing data exfiltration or data corruption of the files 1010
Providing an alert to an administrator regarding the files 1012
Replicating an immutable backup copy of the file system 1014
Unblocking user account or machine address based on a request from the administrator 1016
Placing holds on immutable snapshots so files that have been modified or deleted can be recovered to prior versions and snapshots will be available 1018
Identifying the files that were associated with the malicious event 1020
Presenting a graphical user interface that allows for the restoration the files from the immutable backup copy of the file system 1022
Restoring the files as requested

FIG. 10

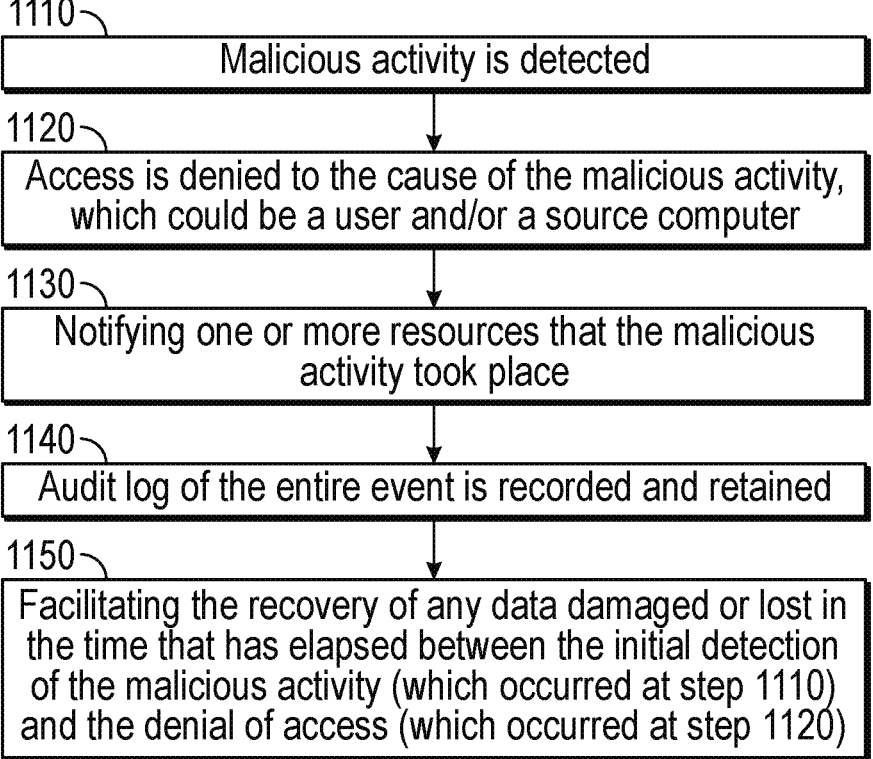

1110

Malicious activity is detected

1120

Access is denied to the cause of the malicious activity, which could be a user and/or a source computer

1130

Notifying one or more resources that the malicious activity took place

1140

Audit log of the entire event is recorded and retained

1150

Facilitating the recovery of any data damaged or lost in the time that has elapsed between the initial detection of the malicious activity (which occurred at step 1110) and the denial of access (which occurred at step 1120)

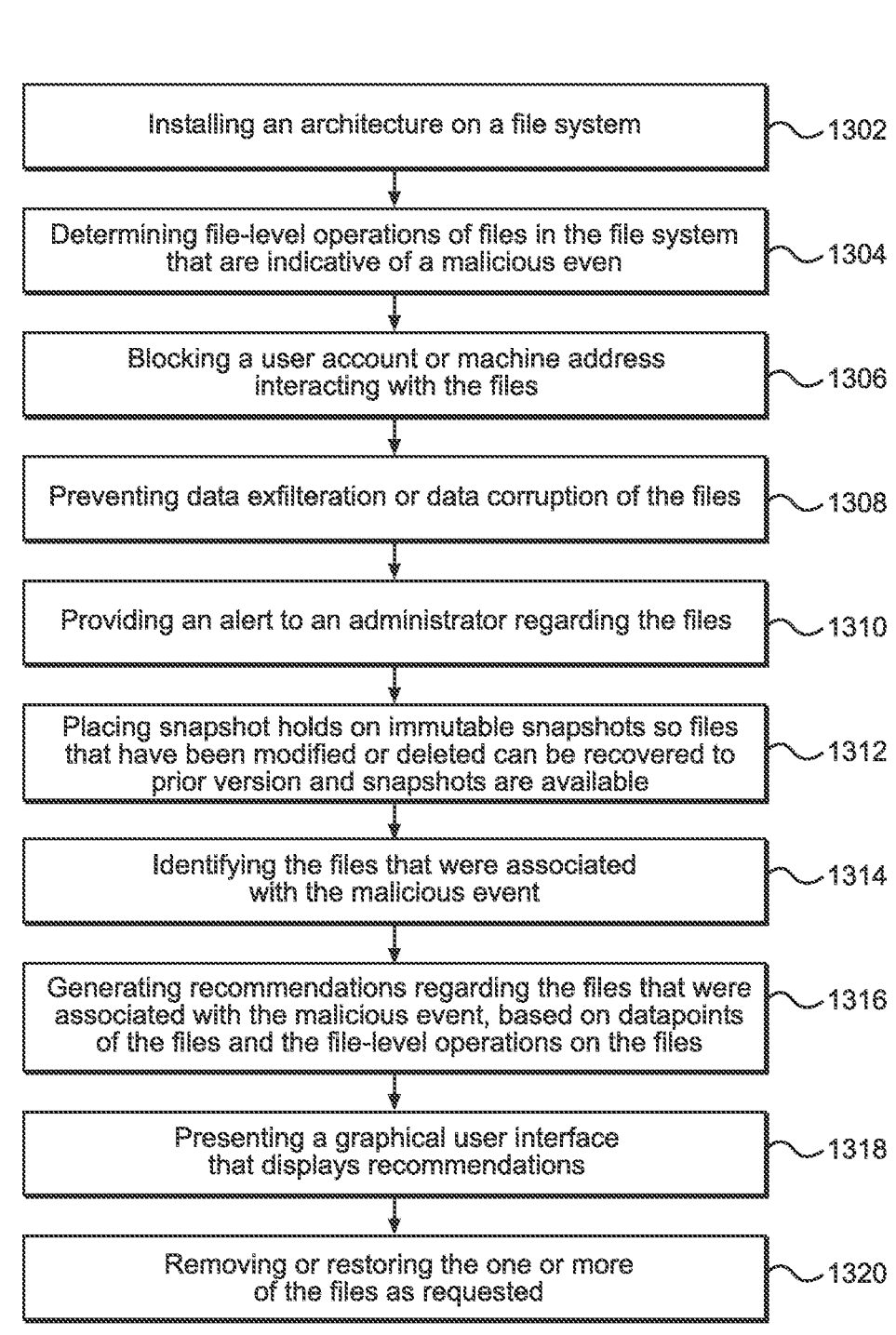

Installing an architecture on a file system  ~1302

Determining file-level operations of files in the file system that are indicative of a malicious even  ~1304

Blocking a user account or machine address interacting with the files  ~1306

Preventing data exfilteration or data corruption of the files  ~1308

Providing an alert to an administrator regarding the files  ~1310

Placing snapshot holds on immutable snapshots so files that have been modified or deleted can be recovered to prior version and snapshots are available  ~1312

Identifying the files that were associated with the malicious event  ~1314

Generating recommendations regarding the files that were associated with the malicious event, based on datapoints of the files and the file-level operations on the files  ~1316

Presenting a graphical user interface that displays recommendations  ~1318

Removing or restoring the one or more of the files as requested  ~1320

Figure 18:
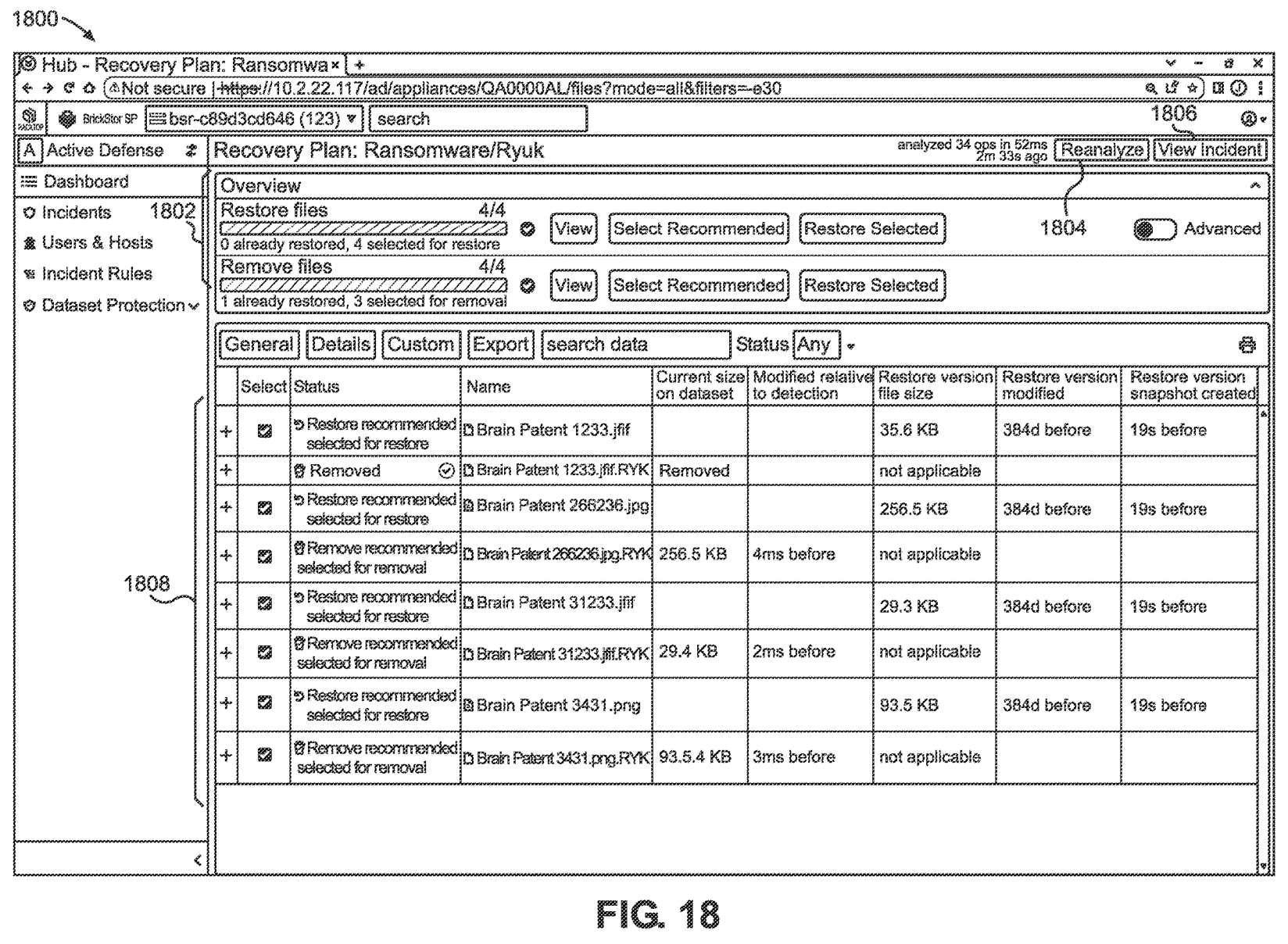

Hub – Recovery Plan: Ransomwa× | +

Not secure | https://10.2.22.117/ad/appliances/QA0000AL/files?mode=all&filters=-e30

BrickStor SP | bsr-c89d3cd646 (123) ▾ | search

1806    View Incident

Active Defense

Dashboard

Incidents    1802
Users & Hosts
Incident Rules
Dataset Protection ▾

Recovery Plan: Ransomware/Ryuk

Overview analyzed 34 ops in 52ms
2m 33s ago    Reanalyze

Restore files    4/4    View    Select Recommended    Restore Selected
0 already restored, 4 selected for restore Remove files    4/4    View    Select Recommended    Restore Selected
1 already restored, 3 selected for removal 1804    Advanced General | Details | Custom | Export | search data    Status | Any ▾

| Select | Status | Name | Current size on dataset | Modified relative to detection | Restore version file size | Restore version modified | Restore version snapshot created |
|---|---|---|---|---|---|---|---|
| + | Restore recommended selected for restore | Brain Patent 1233.jfif | | | 35.6 KB | 384d before | 19s before |
| + | Removed | Brain Patent 1233.jfif.RYK | Removed | | not applicable | | |
| + | Restore recommended selected for restore | Brain Patent 266236.jpg | | 4ms before | 256.5 KB | 384d before | 19s before |
| + | Remove recommended selected for removal | Brain Patent 266236.jpg.RYK | 256.5 KB | | not applicable | | |
| + | Restore recommended selected for restore | Brain Patent 31233.jfif | | 2ms before | 29.3 KB | 384d before | 19s before |
| + | Remove recommended selected for removal | Brain Patent 31233.jfif.RYK | 29.4 KB | | not applicable | | |
| + | Restore recommended selected for restore | Brain Patent 3431.png | | 3ms before | 93.5 KB | 384d before | 19s before |
| + | Remove recommended selected for removal | Brain Patent 3431.png.RYK | 93.5.4 KB | | not applicable | | |

CYBERSECURITY ACTIVE DEFENSE AND RAPID BULK RECOVERY IN A DATA STORAGE SYSTEM

CROSS REFERENCE TO RELATED APPLICATIONS

This application is a continuation-in-part of U.S. application Ser. No. 17/521,676, filed on Nov. 8, 2021, entitled "Cybersecurity Active Defense in a Data Storage System" which claims the benefit and priority of U.S. Provisional Application Ser. No. 63/113,697, filed on Nov. 13, 2020, entitled "Cybersecurity Active Defense in a Data Storage System," all of which are hereby incorporated by reference herein in their entirety, including all appendices and references cited therein, for all purposes.

TECHNICAL FIELD

This disclosure is related to the technical field of network and computer security. More specifically, systems and methods for providing cybersecurity active defense for unstructured files in a data storage system are described herein.

SUMMARY

According to some embodiments, the present disclosure is directed to a system includes a network-based file system, and an architecture installed on the file system, the architecture being configured to protect the file system in a zero trust manner from a malicious attack by a source system, the architecture including a controller that is configured to determine file-level operations of files in the file system that are indicative of a malicious event, block a user account or machine address interacting with the files, prevent data exfiltration or data corruption of the files, provide an alert to an administrator regarding the files, place snapshot holds on immutable snapshots so files that have been modified or deleted can be recovered to prior versions and snapshots are available, identify the files that were associated with the malicious event, generate recommendations regarding the files that were associated with the malicious event, based on datapoints of the files and the file-level operations on the files, the datapoints comprising a client IP address, an account security identifier (SID) or username, a file time stamp, and a file operation type, present a graphical user interface that displays the recommendations to the administrator regarding the files that were associated with the malicious event and, based on the administrator's user input in response to the recommendations, allows for removal of one or more of the files from the active file system and restoration of one or more of the files from an immutable backup copy of the file system or snapshot, and remove and restore the one or more of the files as requested.

According to some embodiments, the present disclosure is directed to a method comprising determining file-level operations on files in the file system that are indicative of a malicious event, blocking a user account or machine address interacting with the files, preventing data exfiltration or data corruption of the files, providing an alert to an administrator regarding the files, placing snapshot holds on immutable snapshots so files that have been modified or deleted can be recovered to prior versions and snapshots are available, identify the files that were associated with the malicious event, generate recommendations regarding the files that were associated with the malicious event, based on datapoints of the files and the file-level operations on the files, the datapoints comprising a client IP address, an account security identifier (SID) or username, a file time stamp, and a file operation type, present a graphical user interface that displays the recommendations to the administrator regarding the files that were associated with the malicious event and, based on the administrator's user input in response to the recommendations, allows for removal of one or more of the files from the active file system and restoration of one or more of the files from an immutable backup copy of the file system or snapshot, and remove and restore the one or more of the files as requested.

BRIEF DESCRIPTION OF DRAWINGS

Exemplary embodiments are illustrated by way of example and not limitation in the figures of the accompanying drawings, in which like references indicate similar elements.

FIG. 10 is a flow chart of an example method of providing cybersecurity active defense.

FIG. 11 is a flow chart of another example method of providing cybersecurity active defense.

FIG. 13 is a flow chart of an example method of providing cybersecurity active defense and rapid bulk recovery.

FIGS. 14-20 are exemplary screenshots of example graphical user interfaces (GUIs) utilized for rapid bulk recovery, in accordance with some embodiments.

DETAILED DESCRIPTION OF EXAMPLE EMBODIMENTS

Overview

Figure 1:
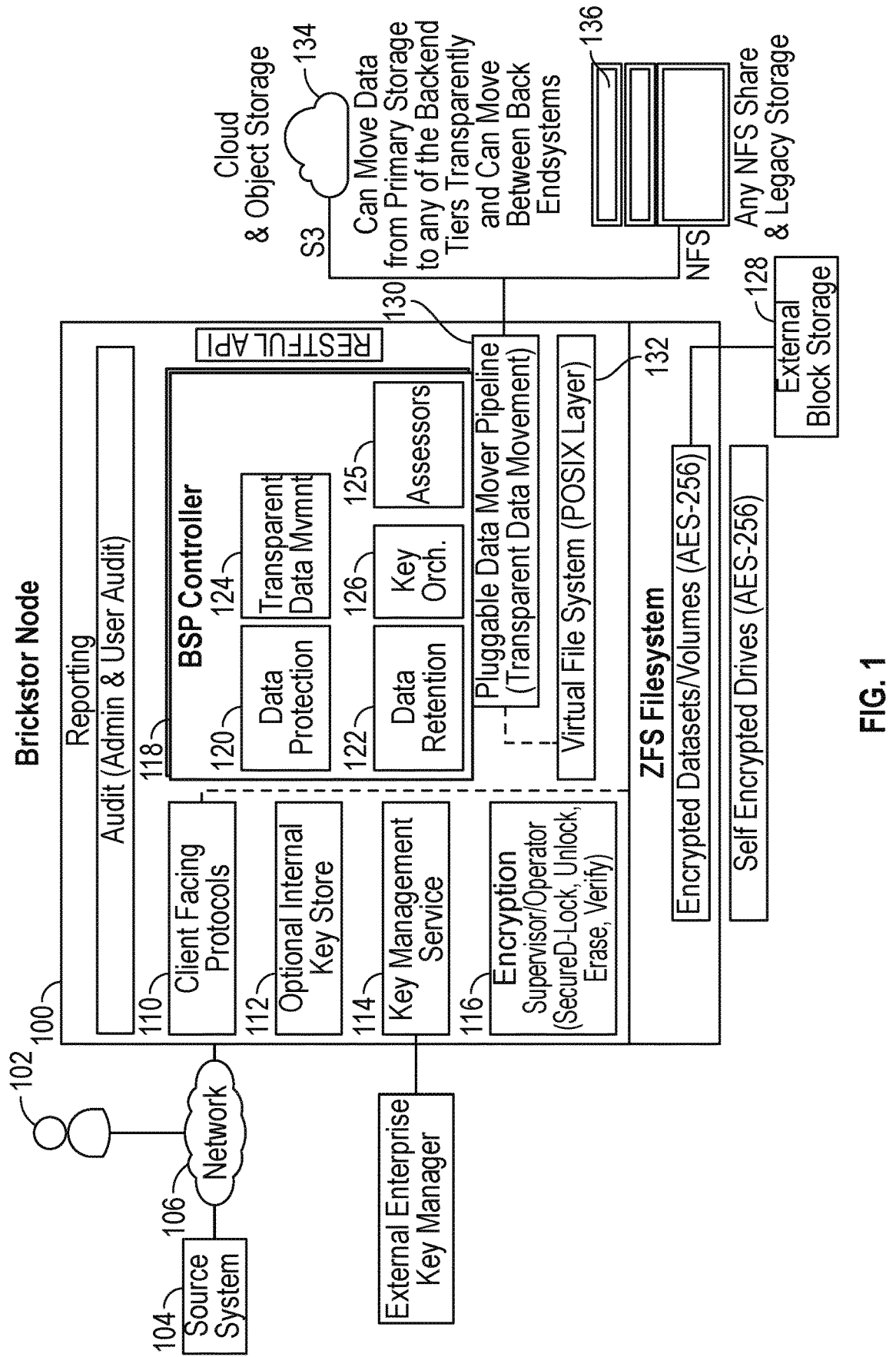
FIG. 1 is an example architecture where aspects of the present disclosure can be implemented for use.

Unstructured file systems (also referred to herein as Network Attached Storage (NAS) systems) use privileged user access controls, but they are vulnerable when user accounts are hijacked through a ransomware attack or a malware attack and increase the damage that such an attack can do to a business, company or organization. Unfortunately, using traditional methods, it may take weeks or months to detect, determine and access the extent of the damage that was caused by a ransomware or a malware attack, as one of the initial steps towards data recovery.

Specifically, there is a need to monitor, detect and stop malicious activity from occurring in real-time in a NAS system, to address the security issues that arise in the context of ransomware and malware attacks. If the malicious activity is stopped early enough, then the ransomware attack may be successfully defeated since potentially no data may be exfiltrated or encrypted.

Unstructured data accounts for approximately 80-90% of the data in most organizations today. By 2023, it is estimated that unstructured data will account for 93% of all data worldwide. And in 2020 damage from ransomware exceeded $20 billion. This explosion of unstructured data and evolving cyber threats has introduced new challenges for infrastructure teams and the C-suite beyond storage density and performance. With information technology decisions being more influenced by security and compliance, the requirement to protect data from natural disasters, breaches, insider threats, and cyberattacks has become critical. To effectively protect data, an organization needs a way to understand where the data resides, the sensitivity of the data, and who has access to each file. Data critical to business operations should be available to enable and accelerate positive business outcomes, but this need creates significant demands on data agility, mobility, and privacy—just to name a few.

The present disclosure pertains to a data security platform that fuses advanced cyber and metadata intelligence capabilities with a high-performance, unstructured file platform to solve the most difficult and pressing problems of ransomware, data theft, insider threats, and regulatory compliance. This fusion of technology is defined as CyberConvergence, which is rooted in the principles of zero trust.

Some embodiments include storage systems that remove the burden of typical multivendor solutions with a single, easy-to-use convergence of storage and cybersecurity on one platform that is far easier and faster to implement and manage. Having a single integrated solution results in a significantly lower total cost of ownership.

An example data storage system of the present disclosure can be embedded with military-grade security, using multiple levels of encryption, built-in key management, and data protection with immutable snapshots. These features in combination with user behavior analysis and proactive remediation result in a solution that is actively protecting data stored on the data storage system.

The systems and methods herein provide a Zero Trust and a data centric model. To be sure, Zero Trust is a model for implementing security and explicit trust at every level of an IT architecture. While traditional Zero Trust focused predominantly on network security, these systems and methods have evolved the concept to include data security so that the most critical assets are protected not just when they are in-flight on the network, but also when they are at rest within the data system.

To successfully employ this concept, a change in perspective switches the context of enterprise architectures and security from the "network" to the "data". Once data becomes the focal point of security, the insufficiencies, gaps, and vulnerabilities of existing data storage technologies become very apparent. One example system is referred to as the BrickStor Security Platform (hereinafter "BSP system").

The BSP system can implement policy-based data management. That is, the BSP system can use policies to ensure data storage is properly provisioned and maintained in accordance with best practices and organizational governance. This approach enables user self-service and workflow automation with centralized governance. The BSP system uses workload-based storage profiles that reduce or eliminate the need for admins or users to determine the best storage and security settings. This approach allows the storage system to automatically optimize itself for the workload. Each storage profile has an associated data protection profile that automatically starts when new storage is provisioned, thus ensuring data is protected against natural disaster, human error, or cyber-attack.

Many regulations and standards (e.g. NIST standards) that are relevant in commercial and government sectors focus on the same controls relative to data. These controls mainly focus on data security, access control, and data retention. The BSP system simplifies compliance by enabling users to set policies and controls on the data to maintain continuous compliance. Audits and compliance require an organization to explain how they deploy the controls and demonstrate control compliance through a body of evidence. BSP system is designed to meet these controls and provide exportable and immutable evidence, such as logs or daily reports. Three primary examples of these standards include data encryption for data security, privileged access management, and data protection policies for data retention.

Traditional storage solutions require external, network-based, third party compliance software to scan network shares, review permissions, and detect sensitive content in data. There are two significant security and performance pitfalls with this approach. First, these external tools require a privileged user account to scan all data, which creates an undefendable attack vector for cyber attackers to exploit. Privileged service account attacks are nearly impossible to detect because their normal activity is similar to data exfiltration. Second, external tools place a significant load on the system by stealing bandwidth and IOPS from the operational use of the storage and polluting the cache with unnecessary data. With a CyberConverged approach, data is analyzed internally, negating the need for a privileged account. That attack vector is eliminated entirely, allowing faster response when under attack. Since data is being analyzed as it is written to the BSP system, there is no need for extra expensive I/O or adjusting cache policies.

In some embodiments, systems and methods disclosed herein describe an active defense capability that is embedded within a storage system to detect and stop a malicious activity, such as a ransomware attack, from occurring in real time or near real-time within the storage system.

In certain embodiments, the systems and methods described herein enable data stored within the protected data storage system to detect and stop the spread of malicious activity, including but not limited to, ransomware attacks, data exfiltration attacks, insider threats, and data destruction attacks. Specifically, embodiments described herein provide for a real-time or near real-time analysis of data as it is being operated on, including all data and metadata operations (read/write/modify/metadata operations), for detecting attack patterns.

Furthermore, in exemplary embodiments, the system detects, in real time or near real time, a wide range of attacks, including but not limited to, attacks by a malicious insider, unusual amounts of data being transferred, data access from an unusual or unknown IP address, any type of intrusion or breach, malicious activity or any other activity that is unusual for a user's account that may potentially rise to the level of a security breach or a malicious attack on the NAS system.

Furthermore, the system can not only detect a malicious intruder or unauthorized user, but it can also stop the malicious activity that is taking place in real time or near time. In some embodiments, the system will cut off the intruder's access to the storage system altogether, thereby stopping the attack from occurring. Also, the system will alert the system administrator that an attack is occurring, so that the system administrator can immediately investigate, conduct forensic investigation, and take any further corrective actions as needed.

The data that is typically protected by the system as described herein is the corporate data or the important central business data of the organization, as opposed to other types of data. In exemplary embodiments, the system can perform real time data collection, real time data analysis, and post-analysis on the whole body of data for any given period of time.

Referring now to FIG. 1, which illustrates an example architecture of a BSP system 100, which is a protected storage system, a client 102, source system 104, and a network 106. The network 106 can include combinations of networks. For example, the network 106 may include any one or a combination of multiple different types of networks, such as cellular, cable, the Internet, wireless networks, and other private and/or public networks. The network can include both short and long-range wireless networks.

Prior to describing the BSP system 100, various definitions that may be used herein will be provided for purposes of clarity of description. The client 102 or user will be understood to refer to a system that is used to access data from a file storage system 108 of the BSP system 100 over the network 106. The source system 104 is a computer or device where the malicious behavior is originating from. Some embodiments and use cases may refer to the use of S3 (Simple Storage Service protocol), SMB (server message block file sharing protocol) and/or NFS (network file system file sharing protocol). For example, the client 102 can use SMB, NFS, and/or S3 (or other equivalent protocol) to access the BSP system 100.

As noted above, the BSP system 100 can implement a CyberConverged data security approach that leverages a high-performance, RAM (random access memory) centric architecture to deliver integrated security and compliance features in the ideal location of the data pipeline, without sacrificing IOPS (input/output operations per second) or exposing data through unnecessary privileged account.

The BSP system 100 employs a portable microservices architecture that works cooperatively with common interfaces to provide extensible data management capabilities. The BSP system 100 can comprise a secure read-only operating system that leverages the power of ZFS, a 128-bit file system, to provide advanced high-performance storage capabilities. The architecture is flexible and allows the BSP system 100 to front other storage solutions (both block and file), thereby enabling data security and compliance capabilities into an environment without completely having to replace legacy equipment. This same approach provides a secure and compliant mechanism to leverage cloud technologies such as an S3 compatible object store.

The BSP system 100 can include client facing interface 110, an optional internal key store 112, a key management service 114, and an encryption service 116. In some embodiments, a BSP controller 118 can include logic that comprises data protection 120, data retention 122, transparent data movement 124, and key orchestration 126. As noted above, the file storage system 108 includes a ZFS Filesystem that includes encrypted datasets and volumes. Encryption protocols can include AES-256 or another equivalent protocol. In some instances, self-encrypting drives can be used. An external block storage system 128 can be included in some embodiments.

In general, the BSP system 100 can be configured to detect and stop insider threats and ransomware attacks. The BSP system 100 automatically maintains immutable copies of individual files or the entire file system for rapid file level recovery. The BSP system 100 instantly reports on what files were accessed, as well as alerts security and infrastructure teams via email and webhooks. The BSP system 100 also provides automatic incident reporting, customized responses, and integrates with SIEMs and SOARs.

A pluggable data move pipeline 130 can be coupled to a virtual file system (POSIX "Portable Operating System Interface") layer 132, which in turn provides a virtual interface to the file storage system 108. The pluggable data move pipeline 130 allows for data transfer to cloud and object storage 134 and NFS share and legacy storage 136. In general, the pluggable data move pipeline 130 allows for transparent movement of data from primary storage to any backend tiers, as well as allowing for movement of data between backend systems, such as 134 and 136.

Broadly, the BSP system 100 provides a data-centric zero trust architecture with active defense and policy enforcement against unusual data access, ransomware, insider threats and excessive file access. The active defense features of the BSP system 100 can immediately alert security and infrastructure teams about suspicious behavior as well as block the suspicious user accounts and IP (Internet Protocol) addresses from accessing further data. As it pertains to ransomware, the BSP system 100 can be configured to create a cyber resilient architecture that stops and contains the ransomware attack, automatically generates an incident report and allows other non-offending users and applications to access data and continue to deliver critical services. The built-in incident management features make it easy to determine the source of the attack and immediately restore files that were affected from immutable snapshots and return the system to service quickly.

The BSP system 100 proactively protects unstructured data in the file storage system 108 using inline real time assessors that are looking for malicious and abnormal file activity conducted by a user or application. The BSP system 100 can implement active defense mechanisms that are extensible and can tie into an organization's security ecosystem through webhooks and email alerts. In addition to detecting abnormal access and employing a zero-trust evaluation model for file operations the BSP system 100 can enforce a cybersecurity data policy and stop an attack in real time before it is too late.

By default, the BSP system 100 has assessors 125 that detect, for example, excessive file access events such as reads, writes and deletes per data set. The assessors 125 can also detect unusual file access events, such as file access by a privileged account for example. For example, a privileged account, such as an administrator account, likely rarely performs file level actions. The BSP system 100 can also detect specific events, such as ransomware and/or another malicious event.

The following descriptions reference additional figures individually; however, reference may be made to FIG. 1 throughout. In some instances, multiple figures may be referred to collectively.

Figure 2:
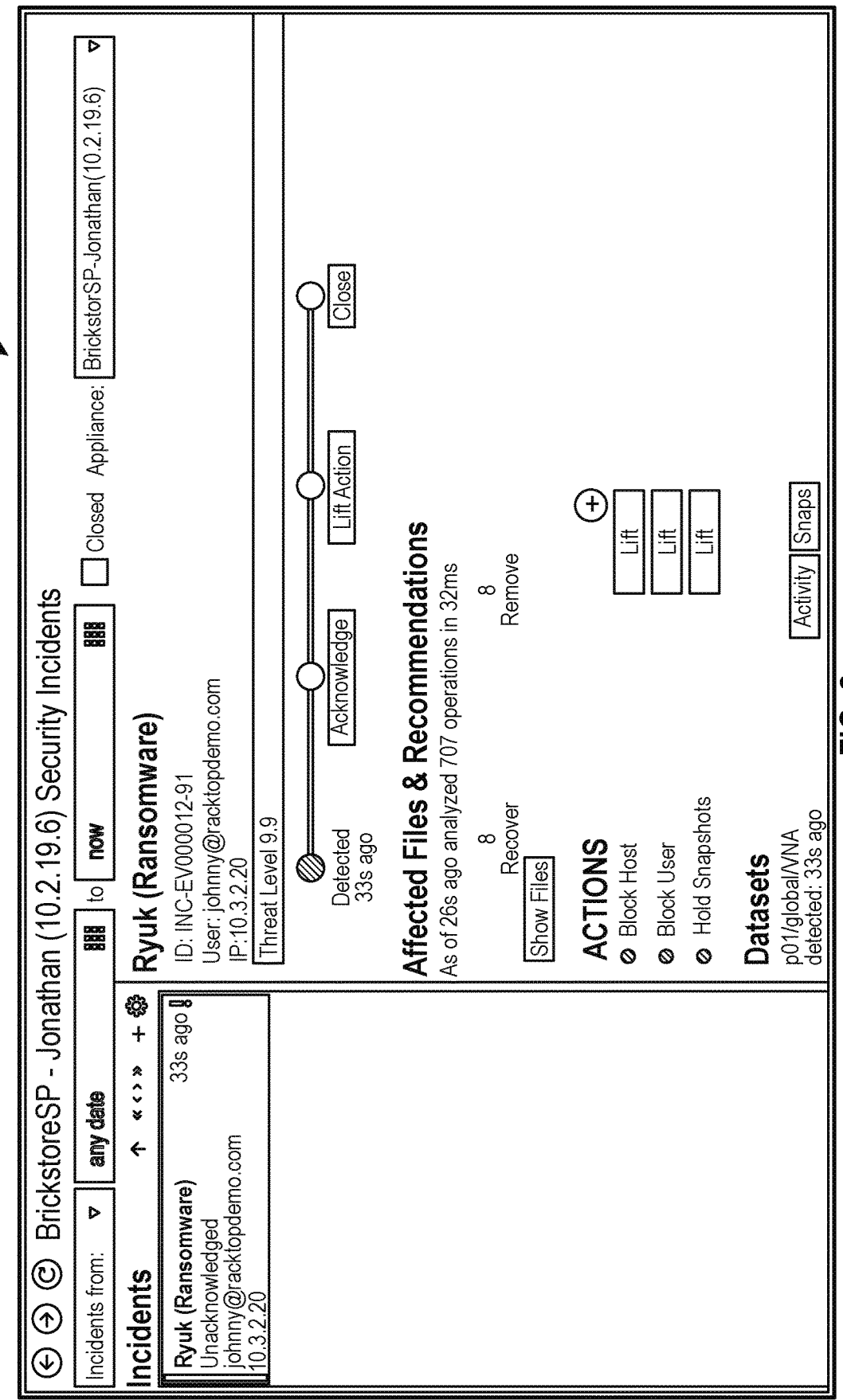
FIG. 2 is an example screenshot of an example incident report that identifies a Ryuk ransomware event.

FIG. 2 is an example screenshot of an example incident report that identifies a Ryuk ransomware event. The GUI 200 provides an event timeline that indicates when the malicious event was detected and acknowledged, as when certain actions, e.g., "lift actions," were taken to remove blocks on certain IP addresses of users (such as source systems), as well as when the event was closed. The GUI 200 can identify how many files of the file storage system 108 were implicated in the attack. A user can select and see each of the files that were impacted, as well as remove the affected files. The GUI 200 also includes a listing of Actions. Actions that may be taken relate to specific accounts, source system identifiers, and other similar data related to the entity, which were detected to be associated with the files that were the subject of the detected event. These accounts, addresses, users and so forth can be automatically blocked from accessing the file storage system 108. In addition to identifying users, machines, and/or networks implicated in the detected event, the admin can also choose to hold snapshots that were associated with the detected event. In instances where the admin determines that an account or machine was not involved in the detected event (or when the detected event was not actually malicious), the admin can remove a hold on the account or machine by selecting a "lift" button adjacent to the particular account or machine.

Figure 3:
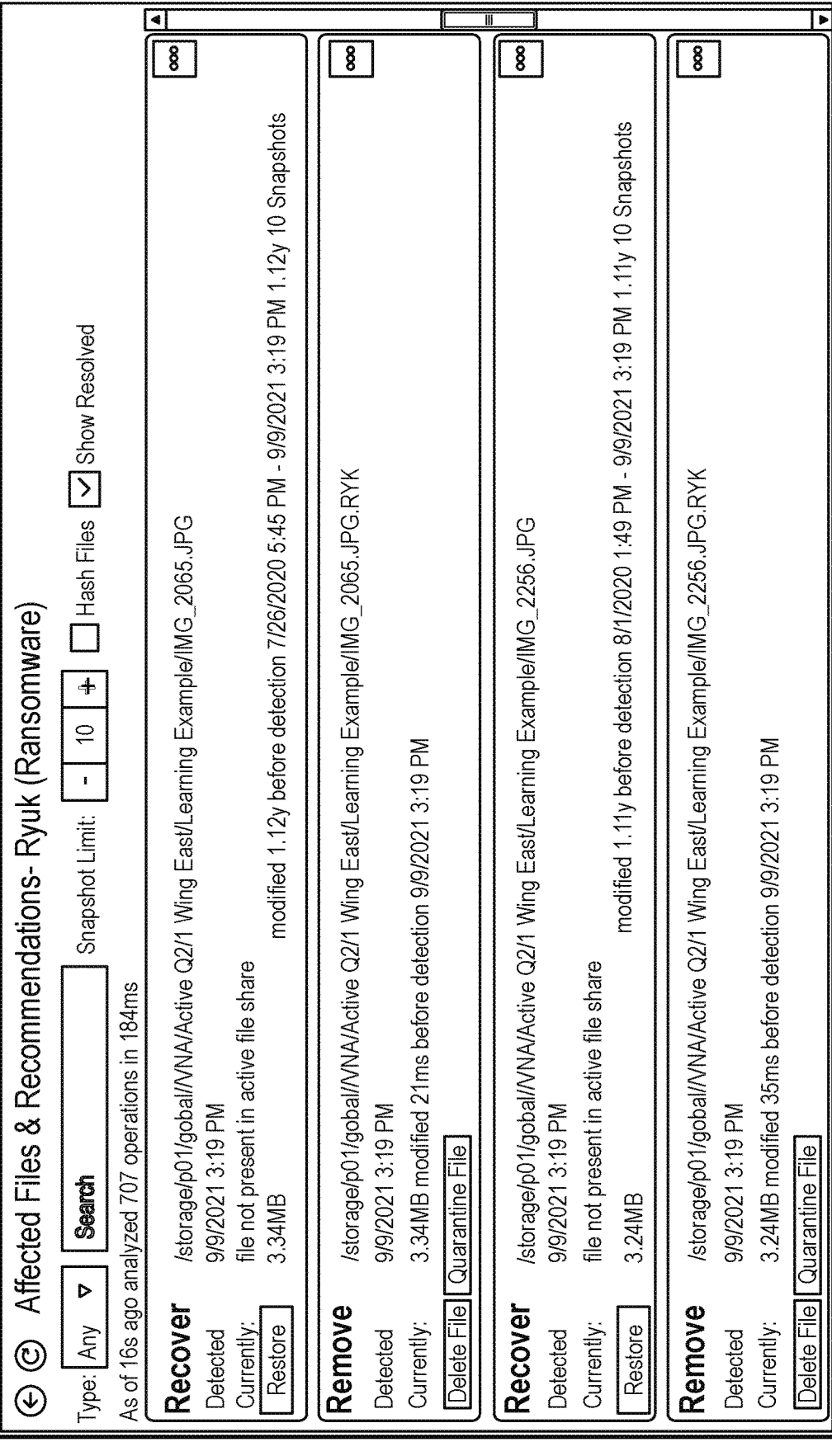
FIG. 3 is a screenshot of an example user interface that can be used to recover files affected by the identified ransomware event.

FIG. 3 is a screenshot of an example user interface 300 that can be used to recover files affected by the identified ransomware event. Each file is identified in terms of detection date and time, if the file has been removed from or sequestered in the file system, as well as if the file is available for deletion, quarantine, or restoration.

As noted above, the BSP system 100 can be configured to implement security policies. Organizations can add specific rules and incident responses based on their organizational needs. The BSP system 100 can function as another security sensor within a company's infrastructure to eliminate blind spots and detect attackers that may sidestep endpoints by going to devices that don't have endpoint monitoring. The BSP system 100 does not rely on agents but can audit all file access activity and inform a security team and other security applications for rapid response.

Figure 4:
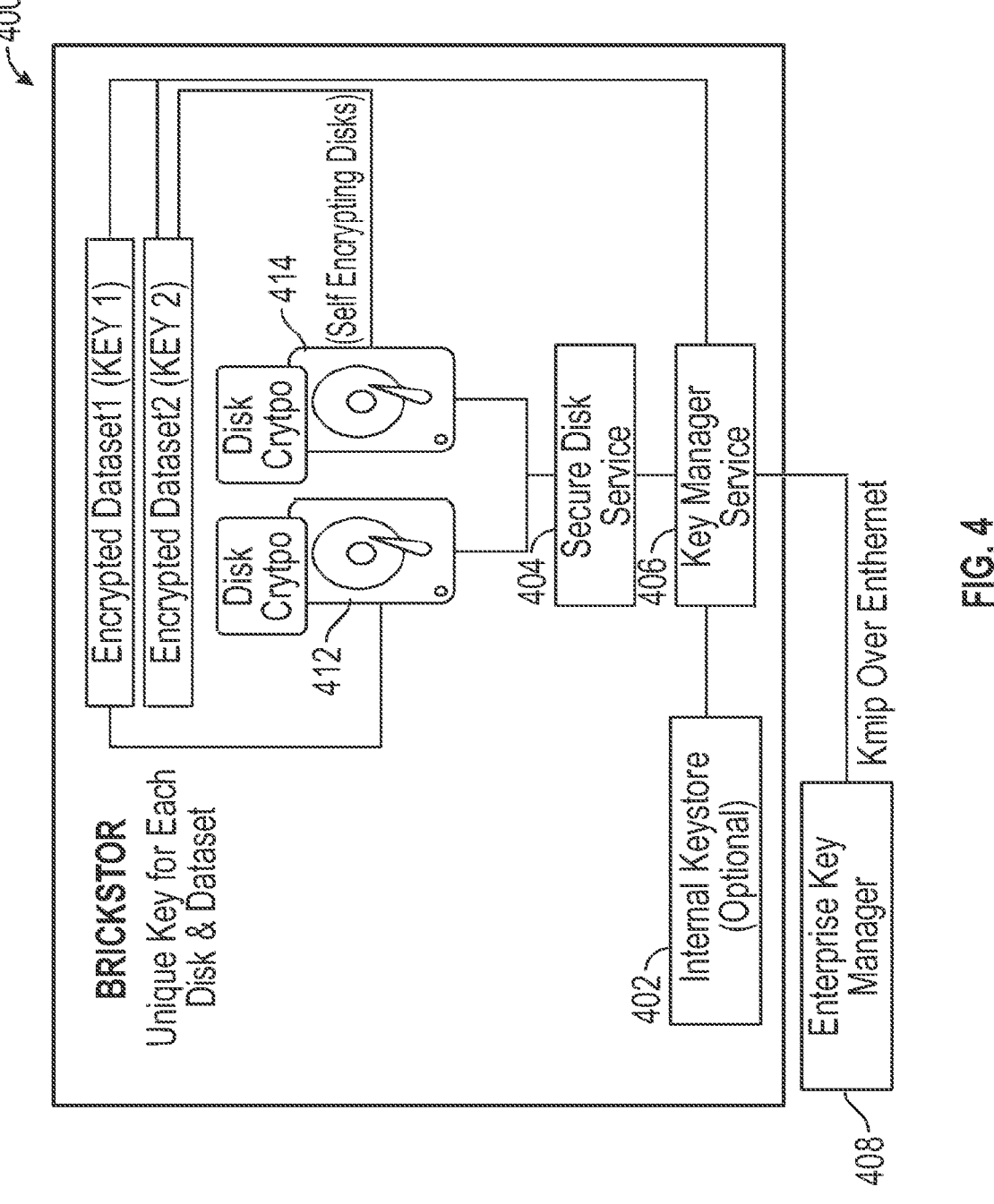
FIG. 4 schematically illustrates an example data encryption architecture that can be used by the BrickStor Security Platform (BSP) system.

FIG. 4 schematically illustrates an example data encryption architecture 400 that can be used by the BSP system 100. The architecture 400 comprises an optional internal keystore 402, a secure disk service 404, a key manager service 406, and an enterprise key manager 408.

The BSP system 100 provides two levels of encryption for data at rest and in flight. For data at rest, a first level of encryption uses FIPS (federal information processing) AES-256 level 2 validated drives, such as drives 412 and 414. The key manager service 406 in conjunction with the secure disk service 404 provisions and manages the encrypted bands on the disk.

Data is automatically encrypted and decrypted at line speed as it is written and read to the disk. This applies to both data and cache devices. The secure disk service 404 can crypto-erase drives as well to meet NIST media sanitization requirements. This is accomplished nearly instantaneously by resetting the data encryption key to a new random key. The second level of encryption for data at rest is accomplished by uniquely encrypting each dataset or volume in the pool with AES-256 encryption that leverages the Intel AES-NI instruction set to provide secure and performance efficient encryption. This can be leveraged in conjunction with compression and deduplication as it occurs after the inline and deduplication pipeline. Dataset encryption can be enabled during dataset creation, providing at rest protection for all user data (e.g., file contents, names, and attributes).

The default encryption algorithm is AES-256. Each user data block on the disk is encrypted via a per-dataset random 256-bit master key, which is generated during dataset creation and is inaccessible outside of the kernel. A master key may be encrypted via a user-provided wrapping key to allow periodic key rotation, which is controlled by a fully audited key management policy engine. Wrapping keys are random 256-bit keys that are generated by the key manager or user-provided.

When using dataset encryption, replication users also receive the benefit of replicating data to another location (i.e., remote datacenter or the cloud) at a block level without having to expose the key to the remote site. This encrypted data is replicated over an encrypted channel, meaning the data is encrypted twice in flight. For recovery purposes, data can just be recalled from the remote site back to the primary site or the key can be provided to the remote site to decrypt the data and reconstitute operations. Administrators can define a policy for how keys should be forwarded, based on organizational security requirements. Most external or third-party block level backup or replication tools require the re-encryption of data and suffer from data ballooning during the process. This encryption takes full advantage of the existing data protection service's differential data blocks and does not suffer from re-encryption, ballooning, or inflation.

A key manager service 406 manages encryption key material as well as maintenance functions, such as automatic key rotation, periodic key verification, key activity auditing, and reporting. The key management daemon of the key manager service 406 can store keys in a secure local database, on a removable disk, or connect to a KMIP (Key Management Interoperability Protocol) compliant enterprise key manager. The key orchestration architecture allows customers to use their own key material to provide the highest-level trust in key material as is often required by government agencies and financial institutions. These features provide complete transparency to the user about what is encrypted, key verification, key rotation dates, and more through built in reporting. The policy engine enables users to set a key rotation policy that will enable requests for new keys on a defined schedule for automatically rotating keys in accordance with organizational policy.

The BSP system 100 is configured to provide unique User Behavior Auditing (UBA) capability is the perfect defense against cyber-attacks and insider threats. UBA provides a real-time stream of user activity, which captures extensive detail including the identity, source IP address, and protocol. User behavior activity can be analyzed within end-user facing user interfaces, through a data manager, or automatically forwarded to an RFC 5424 compliant SIEM (security information and event management) or anomaly detection engine. The manager can provide a feature rich data visualization interface, which displays top users, hot files, and activity outside of normal business hours. It can also easily help determine who moved or deleted a file, a common problem for many IT organizations today. Future improvements to the UBA engine include automatically acting on data anomalies or known patterns to kick off system policy or user prescribed workflows.

The BSP system 100 supports full integration with active directory and LDAP (lightweight directory access protocol) to maintain consistent identity and access control. When properly configured, the BSP system 100 is capable of cross protocol access to files via both NFS and SMB.

The BSP system 100 can employ multiple methods to ensure system integrity and operating system integrity. Autonomous communication between enabled devices and the cloud support infrastructure leverages a combination of mutual TLS (transport layer security) and fingerprinting technologies to eliminate spoofing. All communications paths are SSL encrypted using SHA2 algorithms and management services support TLS inbound connections.

The BSP system 100 can expose an API (application programming interface) uses signed JWT (JASON web) tokens with RSA (Rivest-Shamir-Adleman) signature verification. Endpoints (e.g., clients and/or enabled data stores) are additionally secured with access control permissions tied to Active Directory™ user accounts. The operating system and upgrades are deployed as read-only images that are cryptographically signed and verified before installing. Operating systems are not installed like typical software. Instead, the BSP system 100 provides a secure RAP (resource allocation profile) format that enables images to be deployed in a similar manner to firmware on a hardware chip.

The BSP system 100 supports staging updates and rebooting during convenient hours. Multiple images can be loaded on the system at one time, which allows for booting into older images in the instance of an incompatibility. The BSP system 100 does not suffer from traditional complications, such as patch ordering issues and library variability because of the RAP deployment model. The entire OS can persist in a RAM disk, which means alterations to binaries will not persist. Configuration data can be saved between reboots. This "stateless" approach provides optimal security and ease of lifecycle management.

Administrators can run NIST compliant media sanitization operations in the BSP system 100 that may erase the data on the disk before re-purposing the system or destroying it. Metadata and access control settings are all stored with the data on the data pools. Thus, the controller may not require any reconfiguration or prior information about storage pools to import them, which guarantees 100% data portability even when some disks are missing. The controller can read all the necessary metadata from any member disk in the pool and self-configure and prepare shares from the data contained within the pool. For bulk data transfers, drives can be transported in an encrypted and locked state from one site to another. The keys can be separately transmitted electronically. When the disks arrive at the other site, the system will be able to unlock the drives and read all the data and access control settings from the pool, making them immediately available for use.

Figure 5:
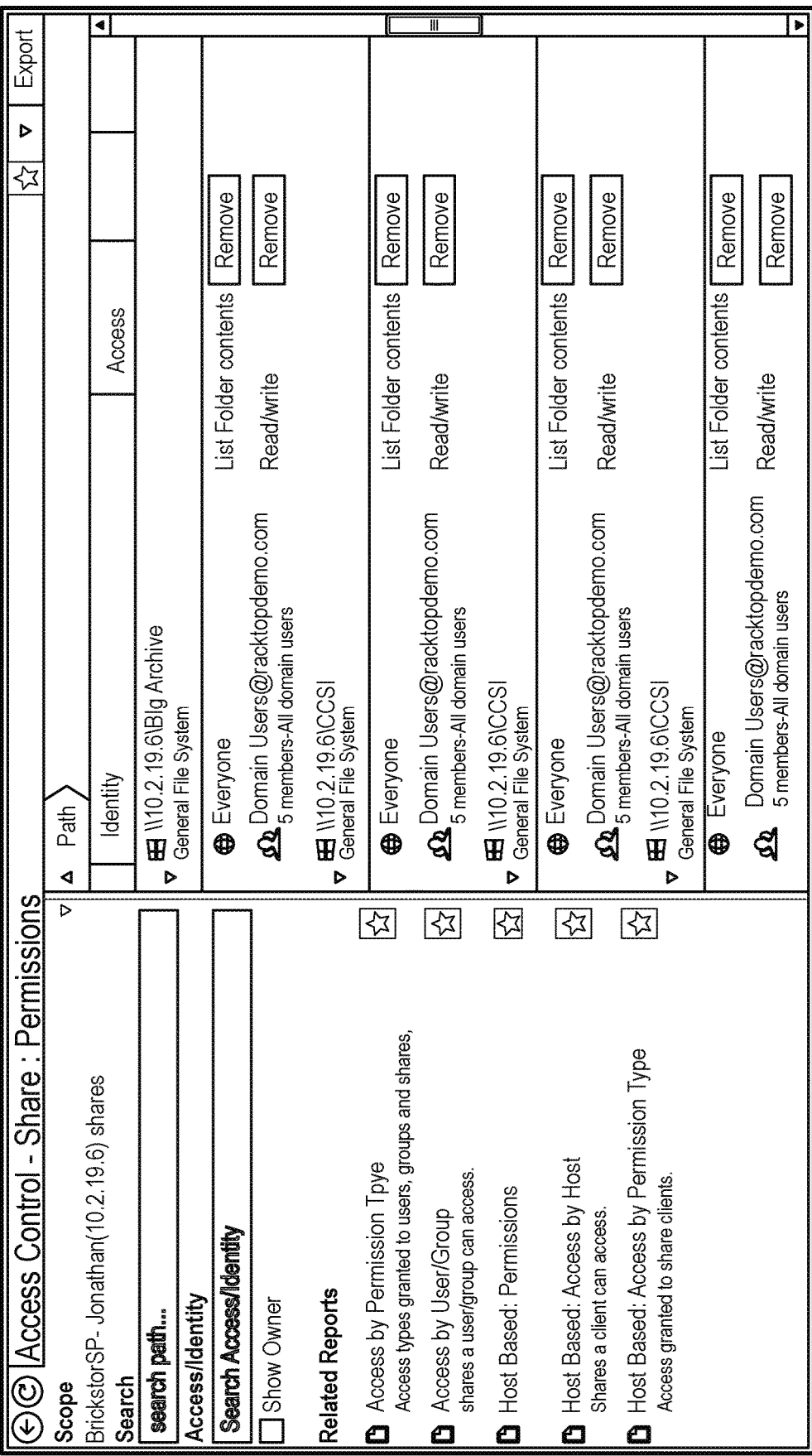
FIG. 5 is a screenshot of an example user interface that allows an admin to review permissions to the network file share and remove permissions or export the report for review by another stakeholder.

Referring now to FIG. 5, the BSP system 100 is configured to provide privileged access management. The BSP system 100 integrates with Active Directory/LDAP to enable data owners to review access control permissions. Data owners can see in real time what groups and users have access to a specified network share or review what network shares a user or group has access to on the BSP system 100. This built in capability can be extended into a workflow to provide data owners the ability to periodically review access management and acknowledge that access settings are still appropriate to meet the intent of the NIST standards. Furthermore, the system can create temporary access control permissions, so that users will have expiring access to a network share based on a temporary need or project task. This data owner centric approach puts the control with the people who have equities in the data and eliminates the storage admin as a middleman or obstacle to accurate and effective access management. Changes to access control settings can be logged for review and compliance purposes. In the event of a ransomware attack, explicit deny controls are placed at the top of the access control tree to prevent data exfiltration or continued corruption as illustrated in the GUI 500 of FIG. 5.

With respect to data retention, the BSP system 100 can implement a data protection engine that includes a collection of services, which manage automatic snapshot creation, expiration, and retention based on pre-defined policies. Data protection is always on and inherent, which means that as new datasets are created, admins never have to remember to include that data. Custom retention holds can easily be added to override policy-based expirations. Users can also extend, reduce, or completely remove the original expiration period for the snapshot.

The BSP system 100 supports legal holds that can be assigned unique identifiers, such as project ID or investigation ID. This prevents data from expiring based on the normal expiration date to meet legal or special requirements. Reports accessible through the BSP system 100 quickly display which datasets have current holds. Any data with a hold on it cannot be destroyed by any mechanism until all holds have been removed. Built-in retention reports allow users to review and monitor all data protection policies to ensure they are compliant with the organization's IT governance standard. Any deviations can be put back into compliance from within the interactive reporting screen. If retention standards change, admins can review current policies and adjust them to meet the new minimums or maximums. For example, if an organization's previous policy only required three years of data retention but a new policy requires seven years of data retention, an admin can change all appropriate policies system wide to increase retention from a single compliance screen in just a few clicks.

Administrative actions are audited and logged in a local database and can also be forwarded to an RFC 5242 compliant data store. This provides a complete accounting of all changes to the system that have been made, including changes in access control. This data can be reviewed within the BSP system 100 or with log forwarding on an external SIEM. The audit capability can also provide insightful information about who had access to data when performing forensic analysis or e-discovery. Providing a rapid understanding of what happened after an event, such as a cyber-attack, data loss, or malware incident can be invaluable in salvaging a reputation and providing accurate information to public relations and legal counsel.

Figure 6:
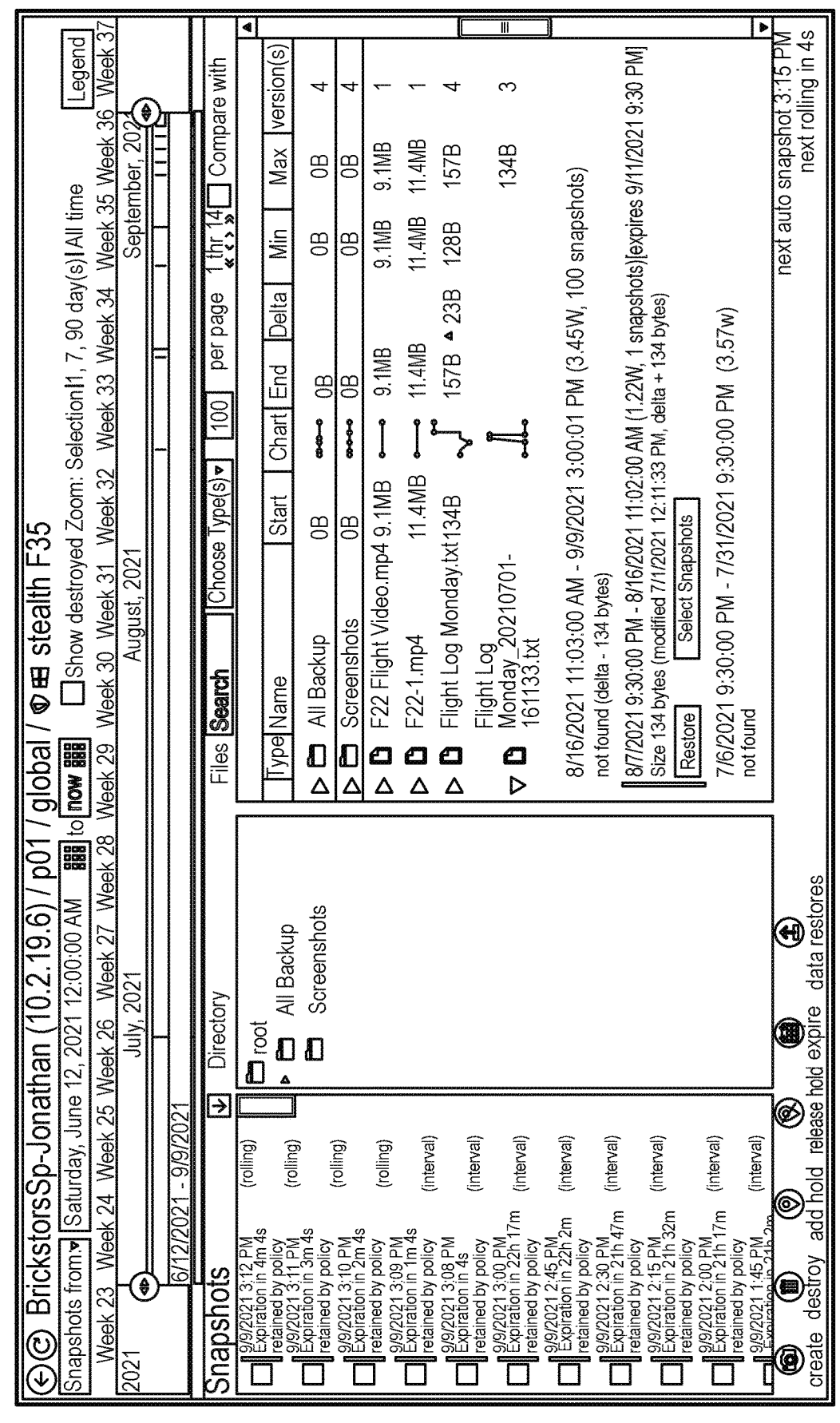
FIG. 6 is a screenshot of an example indexing and file restore user interface that is available through the management interface or API call.

The BSP system 100 can also provide unique metadata intelligence services. For example, the BSP system 100 can provide indexing capabilities. The BSP system 100 comprises a metadata intelligence engine, which is comprised of multiple services that index and analyze file metadata. Each file's full metadata is indexed, including all versions in all snapshots, basic file information, magic numbers, access control settings, file type, and location, to name a few. This is accomplished across hundreds of millions of files with limited system impact using a patent pending "fast indexing" approach, which eliminates the need to re-index data as it is created or modified. Deleted files are also captured and stored to facilitate simple recovery. Indexes are available for all data, accessible through a management interface or through API calls. An example indexing and file restore GUI 600 that is available through the management interface or API call is illustrated in FIG. 6.

The BSP system 100 enables unique data storage features. A unified global manager can be implemented that allows for global command and control of multiple deployments of the BSP system 100 through a single user interface. This unified management simplifies data management and enables rapid provisioning. Users can search for files and forecast data growth. The unified global manager provides admins with single click executable suggestions for resolving capacity contention or shortages. It is a powerful interface that simplifies storage administration and provides managers with a detailed understanding of return on investment and projected storage needs by department, application, or location.

Figure 7:
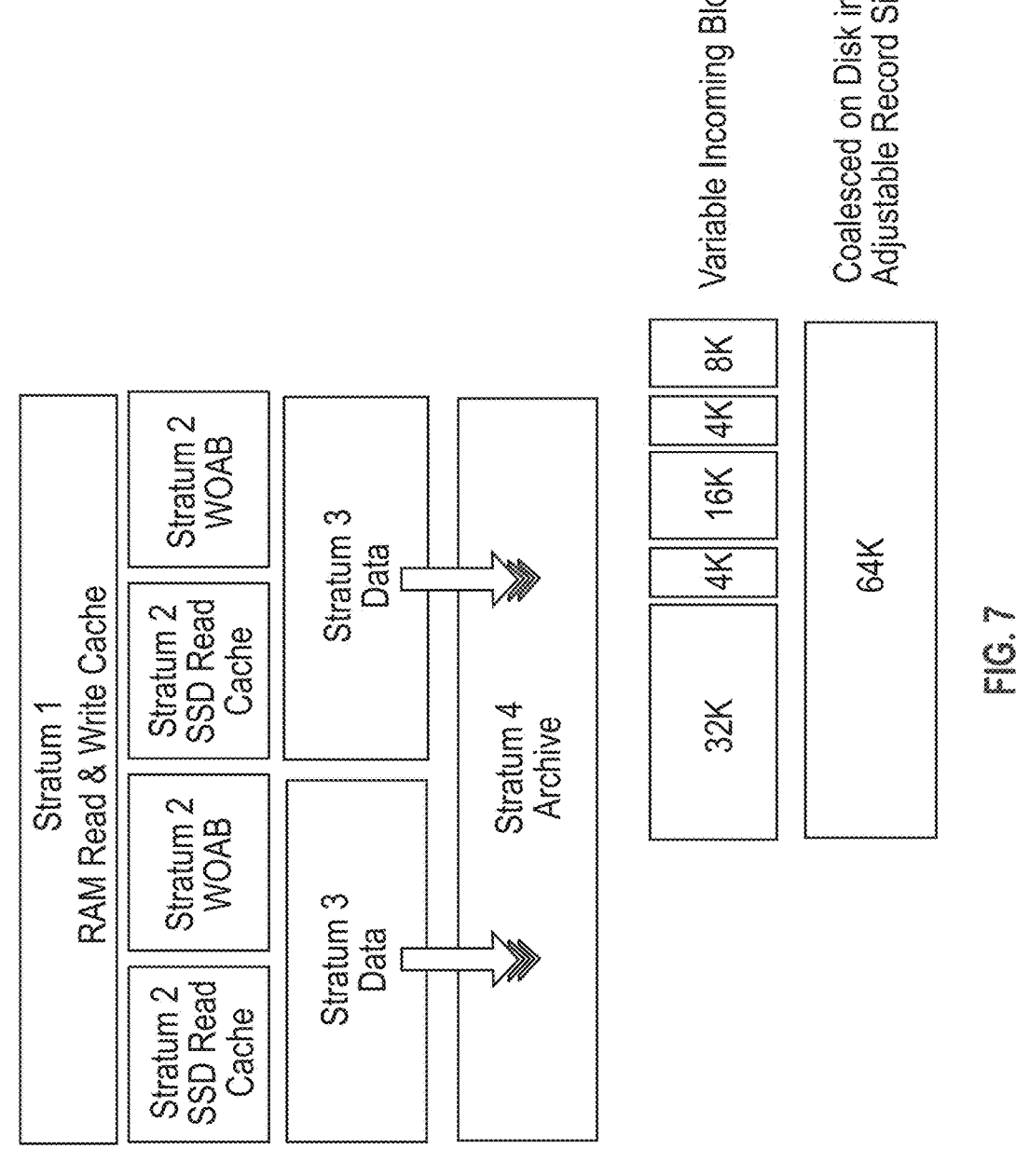
FIG. 7 schematically illustrates an example hybrid storage system.

Referring now to FIG. 7, which schematically illustrates an example hybrid storage system 700. The architecture of the hybrid storage system 700 improves performance while reducing equipment costs. Hybrid storage combines spinning disks with other acceleration components like RAM and SSDs. The hybrid storage architecture leverages a stratified data placement model, providing revolutionary performance and cost benefits. A 4-Stratum architecture can be used to intelligently place data across DRAM, NAND Flash, and spinning disk with an architecture that is optimized for total performance. Typically, 70-80% of data IO requests are serviced by Stratum 1, comprising 100% DRAM at 300× lower latency than NAND flash in a Solid State Disk.

BrickStor SP minimally uses two strata—Stratum 1 for cache and Stratum 3 for data. Stratum 1 is 100% DRAM and is the layer 1 read and write cache. The data stratum can consist of SSDs or hard drives, depending on the use case. A single BrickStor SP appliance can concurrently have a variety of device types in the data stratum to support a variety of workloads and cost constraints. For example, within RackTop's customer base, SSD-only tiers support the most demanding random TO in support of specific relational databases or virtual desktops, while a set of 7200 RPM SAS drives in the data stratum support virtual machines, file shares, and less demanding databases.

Because Stratum 1 is 100% DRAM, it provides the lowest possible latency for shared storage. Stratum 1 cache is scalable to over 1.4 TB s of data per cluster with nanosecond latency. This proportion of Stratum 1 cache to Stratum 3 data capacity is a significant performance differentiator compared to other traditional and hybrid storage arrays, resulting in immediate and long-term cost savings. Write coalescing and transaction groups aggregate incoming blocks in RAM within Stratum 1, writing out to the data stratum in defined intervals to reduce disk thrashing due to intensive random IO. The system can leverage self-tuning algorithms to keep the most frequently and most recently used blocks of data in Stratum 1 to serve read requests with the lowest total latency.

Optional devices in the second stratum further improve read and write performance. The Write Optimization and Acceleration Buffer (WOAB) absorbs the impact of synchronous random I/O to the appliance and shields the data stratum even further from this performance burden. The WOAB offers DRAM latency without volatility, adding latency improvement benefit even to all SSD Stratum 3 configurations.

An optional read cache can be added to Stratum 2. The Stratum 2 read cache (S2RC) extends the capacity of the Stratum 1 DRAM cache acting as a level 2 buffer. The stratum 2 Read Cache will hold blocks of data when there is no longer enough space to hold them in Stratum 1, providing orders of magnitude better performance over a data stratum with SAS hard drives.

The fourth stratum is the archive stratum. Data can be replicated or tiered to this stratum. Transparent Data Movement (TDM) technology can tier data from Stratum 3 to Stratum 4 based on policy. Stratum 4 can take the shape of an archive data pool, another NFS capable storage array, or an object store. Any of these solutions can be located on premises or in the cloud.

Hybrid storage disclosed herein provides a stratification model that maximizes performance for data devices while allowing administrators to create different resource pools to meet a dynamic range of performance profiles. Pools can be optimized for large streaming data sets, small blocks with a lot of random IO, or archives where data is written and rarely read—ideal to meet mixed workloads in a cloud environment.

The BSP system 100 inherently supports CIFS/SMB, Apple File Protocol, NFS3/4.1/4.2, and iSCSI with no limit on the number of volumes or datasets presented. For security and compliance purposes, the platform focuses primarily on file protocols over client facing block protocols. With client facing block protocols, the data becomes opaque to the BSP system 100, meaning that the system cannot look introspectively into the data to report on items such as user behavior and access control or provide advanced data management features. An example, optimized BSP system deployment with block storage systems requires LUNs to be exposed over fibre-channel or iSCSI and system mounted, with data being shared and accessed through the file system and protocols implemented in the BSP system 100.

The BSP system 100 supports NFS 4.2 context security labels to provide support for mandatory access control as shared storage for SE Linux. With SE Linux and context security labels, the BSP system 100 is a high performance and scalable shared storage solution for multilevel security (MLS) implementations. MLS implementations allow a single storage solution to provide data across multiple domains at different classification levels. This is a critical capability in securing data while enabling cross-domain collaboration.

Getting to the lowest possible cost per gigabyte requires software features to optimize storage efficiency. Compression is a feature that has negligible impact on a system's performance but has an impact on capacity utilization. The BSP system 100 has compression algorithms available for use and leverages the appropriate algorithm for a particular workload. In some instances, a 2×+ capacity savings is achieved using the BSP system 100 implementation of LZ4. Each block is compressed independently and all-zero blocks are converted into file holes. To prevent "inflation" of already compressed or incompressible blocks, the BSP system 100 maintains a 12.5% compression ratio threshold below which blocks are written in uncompressed format. This early abort mechanism ensures that time is not wasted trying to compress data that is uncompressible. Not only does the BSP system 100 leverage compression for data on the disk in the data stratum but also in all of the caching stratums mentioned before, which translates into fitting more blocks into cache. Because all of the blocks are moving in a compressed format, the system requires less internal I/O bandwidth, thereby increasing system performance.

As a storage service provider to internal customers, it is often hard to predict or forecast the required storage amount for each customer. Thin provisioning by the BSP system 100 offers a method of oversubscription that allows for more flexible and cost-effective storage allocation analogous to how server virtualization has led to server consolidation. Thin provisioning provides efficient capacity management and space allocation that can result in another 50% savings in capital expenditures by eliminating reserved space. Traditionally provisioned storage systems leave admins with an average of 30% to 50% of their allocated space stranded and unused. Thin provisioning combined with capacity forecasting tools enable administrators to forecast when they will need to acquire new physical storage capacity or reallocate capacity. Reservations can be enabled on a per dataset basis to provide a guaranteed amount of capacity to organizations and network shares.

It is rarely the case where one size fits all. The BSP system's 100 dynamic block sizing capability ensures that the storage is optimized for the tenant's application workload on an application-by-application basis. With variable block size, space is efficiently utilized both in cache and on storage, having a positive impact on both capacity utilization and reduced I/O overhead. The BSP system 100 supports record sizes ranging from 4K to 1 MB.

Like compression, deduplication is performed inline and at the block level using a hash of the block. Deduplication is transparent to all other layers of the storage system. Unlike compression, there are some performance and resource tradeoffs to consider when leveraging deduplication on any storage array. The BSP system 100 leverages a deduplication table that is held in memory. Setting a smaller block size will increase the probability of deduplication but increase the size of the deduplication table. The BSP system 100 has onboard tools to analyze data on the system to estimate the benefit of enabling deduplication. For data protection reasons, the BSP system 100 keeps the first, second, and fourth copy of duplicative blocks. For highly duplicative environments with deduplication enabled, write performance can actually improve by saving the operation to disk. However, large deletes can take longer than normal because the system needs to check if it is the last block before each delete. Deduplication is always more effective and better performing at the application layer but there are times with very duplicative data that it makes sense to leverage deduplication at the storage layer. The BSP system 100 inline deduplication can be enabled on the fly per volume or dataset that has duplicative data and turned off for datasets that won't receive benefit.

Figure 9:
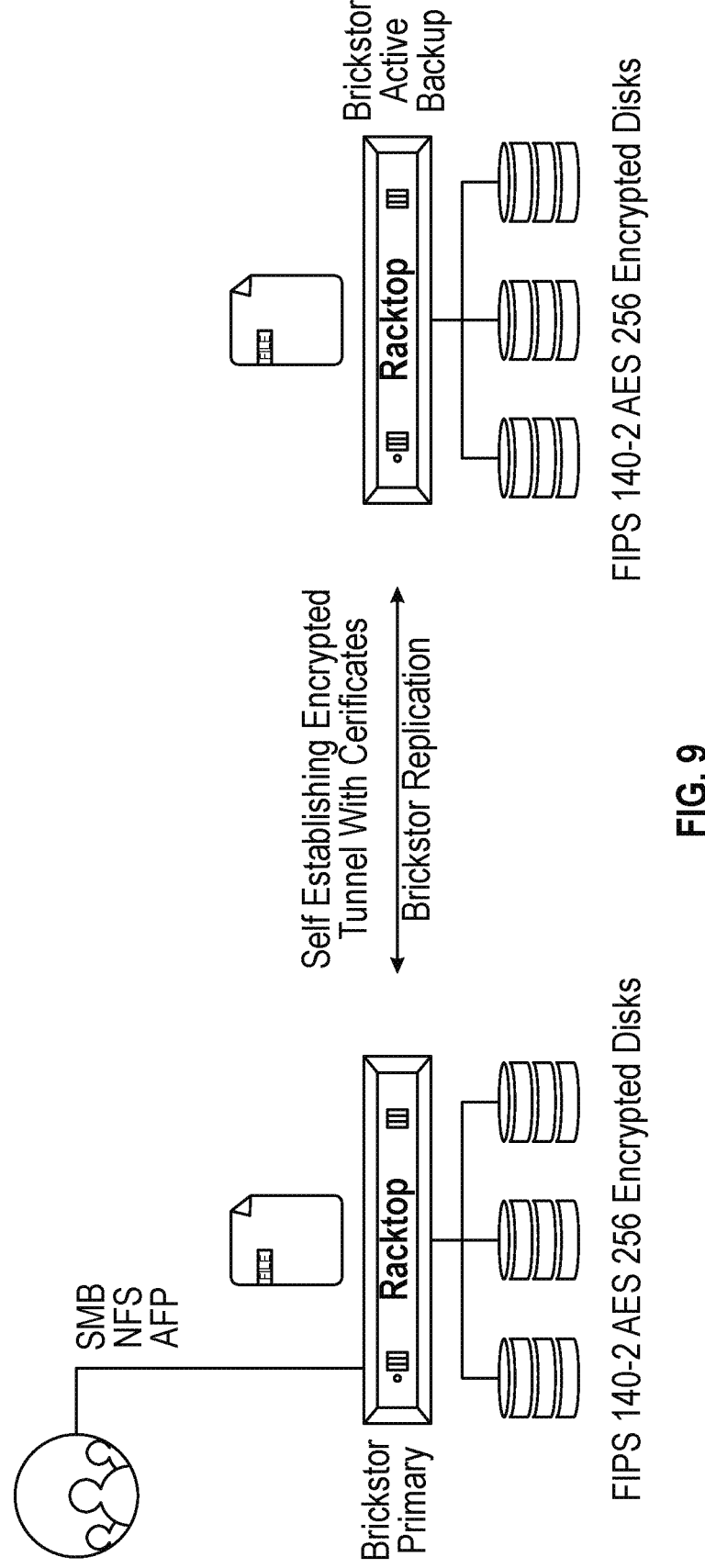
FIG. 9 schematically illustrates the replication of snapshots with encryption between BSP systems.

Data protection policies define how often data is snapshotted, retained, and replicated. Data is automatically snapped and retained, based on default data protection policies set by the type of storage profile or by user-defined custom data protection policies to meet specific business data protection priorities. FIG. 9 illustrates an example GUI architecture that identifies various data protection for a BSP system enabled on a datastore.

Figure 8:
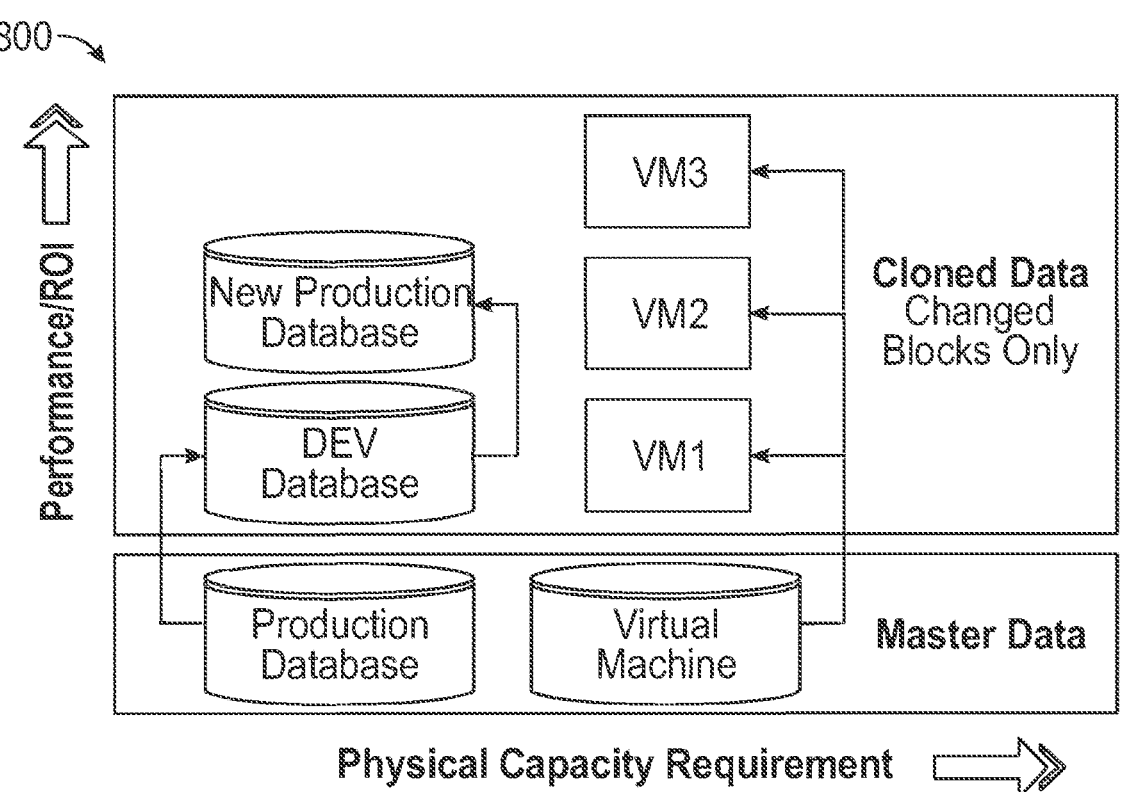
FIG. 8 schematically illustrates a copy on write file system that enables the instantaneous creation of snapshots and clones.

Referring now to FIG. 8, the BSP system 100 can implement a copy on write file system that enables the instantaneous creation of snapshots and clones. At creation, there is no additional space required for snapshots. The BSP system 100 does not limit the number of snapshots you can create or retain per system and does not require pre-reserved capacity. This approach enables the rapid restoration of a version of an individual file or virtual machine from within the snapshot. Entire snapshots can be cloned to become operational for disaster recovery and backup purposes. Snapshots are a critical part of the BSP system's 100 windowless backup and near zero recovery time objective, which enables true Enterprise disaster recovery and business continuity. Unlike competing file systems whose snapshot mechanisms are susceptible to auto-pruning attacks, the BSP system 100 snapshot mechanism is completely immutable, and policy driven, which eliminates ransomware attacks from destroying snapshotted data.

The BSP system 100 provides unlimited cloning capability that enables the instantaneous creation of zero footprint clones and acts as a pre-emptive, performance increasing, deduplication capability. Clones leverage the same core blocks of data as their parent snapshot, which improves performance and caching, since the BSP system 100 caches the most frequently and most recently used blocks of data in DRAM within Stratum 1.

Clones are a great way to run tests or upgrades against a point in time instance of a database or virtual machine to validate patches and upgrades. In large environments with many tenants, offering a cloning capability allows tenants to create hundreds or thousands of clones of the same baseline image while utilizing nominal additional physical capacity. An example clone management architecture 800 is illustrated in FIG. 8.

An example architecture for replicating data is illustrated in FIG. 9. The BSP system 100 enables Smart Folders, which in real-time converts common directories into unique independent file systems. With Smart Folders enabled, the BSP system 100 automatically creates a unique file system on the fly when the client creates a folder over SMB or NFS. This enables traditional POSIX folders in smart folder datasets to have their own storage profiles, encryption keys, and data protection policies. This is ideal for home directories as an isolated dataset that can be automatically created when a new user account is created. It can also be used with virtualization to create clones of VMs, providing space and performance benefits above and beyond deduplication.

The BSP system 100 provides block and file replication technologies that are WAN-optimized and can securely transmit snapshots between systems. The BSP system's 100 block level replication only transmits the changed blocks between snapshots to expedite transmission and reduce bandwidth usage. The BSP system's 100 block level replication has dynamic WAN bandwidth throttling, multi-stream transfer for high-latency, high-bandwidth networks, a lottery-based prioritization engine based on the size, importance, and age of data, and the ability to pause and resume replication without starting over. Replication will auto-recover and restart at a checkpoint if interrupted before completing the replication of an entire snapshot. Replication can occur within the same system, or between multiple storage appliances either over a LAN, WAN, or public network in the cloud. Administrators can choose whether they wish to forward and replicate the dataset and drive encryption keys to the remote system. The BSP system 100 also supports file level replication to other NAS platforms as well as S3 compliant object storage.

All of the features for tractable disaster recovery are built into the BSP system 100, from data protection policies to replication and file recovery. Integrated disaster recovery features ensure data is always protected and that recovery is faster to achieve (lower RTO) and probability of success is near 100%. The architecture enables users to recover using a second physical BSP system 100 appliance or recover in the cloud.

The BSP system 100 supports a dynamic lottery and priority scheme to ensure the most important data is replicated first, driven from the context of the data, operational factors, backlog, preset priority label, and age. The BSP system 100 has five preset levels of priority. The highest level "Critical" will block other data waiting to be replicated until it has completed. The "High", "Medium", and "Low" binned datasets use a scheme to ensure they are replicated in a fair share manner based on the amount of data to replicate, how long they have been waiting in queue and their relative priority. The lowest priority bin, "Background", will only replicate when nothing else needs to replicate and will be pre-empted by any snapshot with a higher priority level. Snapshots with a "Background" priority are never guaranteed to complete. Admins can temporarily change the priority of a dataset to handle special situations or ensure a specific snapshot is replicated immediately.

The BSP system 100 supports one-to-many global file level replication to enable the movement of files to fit a dynamic number of operational workflows. With the File Reflection service in the BSP system 100, files can be multi-way replicated to another SMB or NFS share, as well as an S3 object store. Data can be replicated and synced between multiple geographies, simultaneously preserving last writer changes.

The BSP system 100 provides high availability using dual controllers connected to shared disks over SAS, or when fronting block storage arrays via a shared LUN over fibre-channel or iSCSI. During normal operations, the controllers participate in an Active/Active cluster mode where each controller is managing IO to one or more pools. Pools are members of a resource group, which consists of an IP and one or more pools. During a failover process, the system moves the resource group from one controller to the other. During a resource group failover, the system removes the IP from the original controller and then advertises on the new controller after the pool(s) are successfully imported and datasets are mounted and shared via the appropriate protocol. This operation can be completed in a rapid manner so that clients do not experience a loss in connectivity to the data store. For example, virtual machines running on the data store can continue to run during a failover operation.

The high availability architecture leverages SSDs for write buffers and read cache. These devices are viewable by both controllers so that there is no data loss in the event of a controller failure or power loss. The BSP system 100 uses RAM as the primary read and write cache, but does not acknowledge that data has been committed to stable storage for a synchronous write until it has been written to the write buffer or the data disk. After data is written to the write buffer, the transaction can be replayed by any controller to write the data correctly to the data disks. The BSP system 100 supports 2-node clusters for high availability, but n-way clustering is also contemplated.

The BSP system 100 supports several RAID schemes. Each pool has an associated RAID scheme, but a system can have multiple pools, each with a different RAID scheme, managed by the same controller or in a cluster.

The BSP system 100 supports mirrored, triple mirrored, single parity RAID, double parity RAID, triple parity RAID and striped (no RAID) RAID schemes. In some embodiments, disks are put into RAID groups called vDevs and then data is striped across one or more vDevs to create a storage pool. When multiple vDevs are striped, it creates a RAID-10, RAID-50, RAID-60 or RAID-70 (triple parity) scheme for the data drives based on the parity level of the vDevs.

The write buffer can be mirrored for protection. Read cache is typically not protected with a RAID scheme because the loss of Read cache will not result in data loss. The BSP system 100 supports hot spares that will automatically be added into a vDev to replace a failed device and begin to rebuild based upon the RAID scheme.

When considering a RAID scheme, it is important to understand the intended workload for the pool. The RAID scheme and the number of drives in the system will affect performance and the usable percentage of raw capacity. For this description, raw IOPS are the IOPS provided by the storage pool without the benefit of caching. In a mirror configuration, each vDev delivers the raw write IOPS of a single device/disk and the read IOPS of both devices/disks since the system needs to write to both disks and read data from only one disk. For single, dual, or triple parity schemes, the vDev only delivers the IOPS of one device/disk because it must write data and read data to all devices in the vDev for a successful read or write operation. To add additional raw IOPS to the pool, the admin must add more vDevs to the Pool. When configuring a pool with a specific number of disks, there is a trade off on usable capacity versus IOPS and latency performance. If an admin were to create a pool out of 24 disks, they have several ways to create pools and leverage all available drives.

When cache is considered, the IOPS of the solution improve drastically even with 7200 RPM SAS Drives. For an HA cluster with two pools and dual 10 Gb Ethernet to each node, the system can deliver 140,000 IOPS for a 32K 50/50 Read/Write Workload. For workloads that require high IOPS with consistently low latency, an all flash pool is an ideal choice. Below are performance metrics that can be demonstrated on pools with mirrored vDevs with current generation SAS flash drives.

For throughput sensitive workloads, the single, dual, and triple parity schemes are effective and economical. In some embodiments, data is written to and read from all disks in the pool to create aggregate bandwidth. The system is intelligent and will automatically bypass the write buffer and write directly to disk for throughput biased workloads. As an additional performance accelerator, the system will intelligently prefetch data for multiple client streams and move the data from disk to cache. The example below shows the example performance of a lidar image modeling workload over SMB using 10 Gb Ethernet. The system is a single host with Dual e5-2620v4 CPUs, 256 GB of RAM. The pool consists of five dual parity 6-disk vDevs. This workload uses 32 client threads to initially load the data and then reads the data to process and model the data.

In day-to-day use, when a damaged block is read and detected, the file system of the BSP system 100 automatically repairs itself by copying data from a known good copy or recreating it from parity blocks. Self-repair occurs on the fly as blocks are read. The BSP system 100 can be scheduled to run a preemptive "scrubbing" process, like ECC memory scrubbing, that operates on live and in-use file systems at low IO priority with minimal performance impact. This is valuable for data that is rarely read and may be susceptible to bit rot on disk. Self-healing eliminates silent data corruption and ensures that blocks of data delivered are 100% intact.

The BSP system 100 can expand and resize pools can be dynamically (up or down) by adding, removing, or growing vDevs to the pool. This means capacity can be expanded at any time without interruption or downtime, and disks can be upgraded in place without any data migration. Write buffers and read cache can also be added or removed from a pool at any time without interruption. Best practices dictate that pools are expanded before they become 70% full. This avoids a large imbalance within a pool where read operations are coming from a subset of the pool vDevs, causing an impact on performance. As new data is written to the pool, it will be written to all disks and vDevs within the pool so that it will automatically begin to rebalance.

FIG. 10 is a flowchart of an example method of the present disclosure. The method can include a step 1002 of enabling a microservices architecture on a file system. As noted above, the microservices architecture is configured to protect the file system in a zero trust manner from a malicious attack by a source system. The method can also include a step 1004 of determining file-level operations of files in the file system that are indicative of a malicious event.

The method can include a step 1006 of blocking a user account or machine address interacting with the files, as well as a step 1008 of preventing data exfiltration or data corruption of the files. According to some embodiments, the method can include as step 1010 of providing an alert to an administrator regarding the files. The method can include a step 1012 of replicating an immutable backup copy of the file system.

The method can include a step 1014 of unblocking user account or machine address based on a request from the administrator. This can be based on an admin using a GUI provided by the microservices file system protection service.

The method can include a step 1016 of placing holds on immutable snapshots so files that have been modified or deleted can be recovered to prior versions and snapshots will be available, as well as a step 1018 of identifying the files that were associated with the malicious event. In some embodiments, the method includes a step 1020 of presenting a graphical user interface that allows for the restoration the files from the immutable backup copy of the file system, and a step 1022 of restoring the files as requested.

It will be understood that the order of the steps disclosed in the various methods herein are not intended to be limiting, unless specifically claimed as such. Thus, various steps can be omitted or their order of operations rearranged as would be apparent to one of ordinary skill in the art.

In some instances, the method may include a step of identifying excessive file access events comprising reads, writes and deletes per data set, as well as identifying unusual file access events by a privileged account. One embodiment includes a step of identifying a ransomware event.

According to some embodiments, the method may include establishing a virtual file system and pluggable data mover pipeline, and transmitting files on the pluggable data mover pipeline for external storage in a cloud or other network file system.

In some instances, the method includes establishing an encryption manager that provides a first level of encryption for the files when at rest and a second level of encryption for the files when transmitted, as well as determining a real-time stream of user activity related to the file system, which captures details including an identity, a source IP address, and a protocol.

FIG. 11 is a flowchart of an example method for providing cybersecurity active defense in a data storage system. The method begins with step 1110, where a malicious activity is detected. The malicious activity may be detected utilizing any number of ways and methods, including but not limited to, using attack pattern detection technique, detecting specific ransomware signatures, detecting data exfiltration, detecting that an unusually high volume of data is being accessed or deleted, detecting that an account is being accessed by an unknown system or IP address, detecting that the user's computer has been infected or compromised, and the like.

Then, at step 1120, access is denied to the cause of the malicious activity, which could be a user and/or a source computer. At step 1130, the method continues by notifying one or more resources that the malicious activity took place. At step 1140, an audit log of the entire event is recorded and retained. Finally, at step 1150, the method facilitates the recovery of any data damaged or lost in the time that has elapsed between the initial detection of the malicious activity (which occurred at step 1110) and the denial of access (which occurred at step 1120). Alternatively, in other embodiments, at step 1150, the method facilitates the recovery of any data damaged or lost in the time that has elapsed prior to initial detection of the malicious activity (which occurred at step 1110) and the denial of access (which occurred at step 1120). For attack types and incidents where the rule is set to only alert and not block the user from accessing further data the method facilitates the recovery of any data damaged or lost both before and after incident detection. If the incident rule was not set to block the user and instead the incident rule was just to notify the user, then the system will allow the user to restore files after the incident was detected. As mentioned before, in certain embodiments, the method for providing cybersecurity active defense occurs in real time or in near real time, so the system administrator can be alerted of malicious activities in a timely manner. The system administrator can view what files were accessed by the malicious activity. As one step towards data recovery, the system administrator can revert the data back to the last version saved (via a data snapshot) taken prior to the occurrence of the malicious activity.

Figure 12:
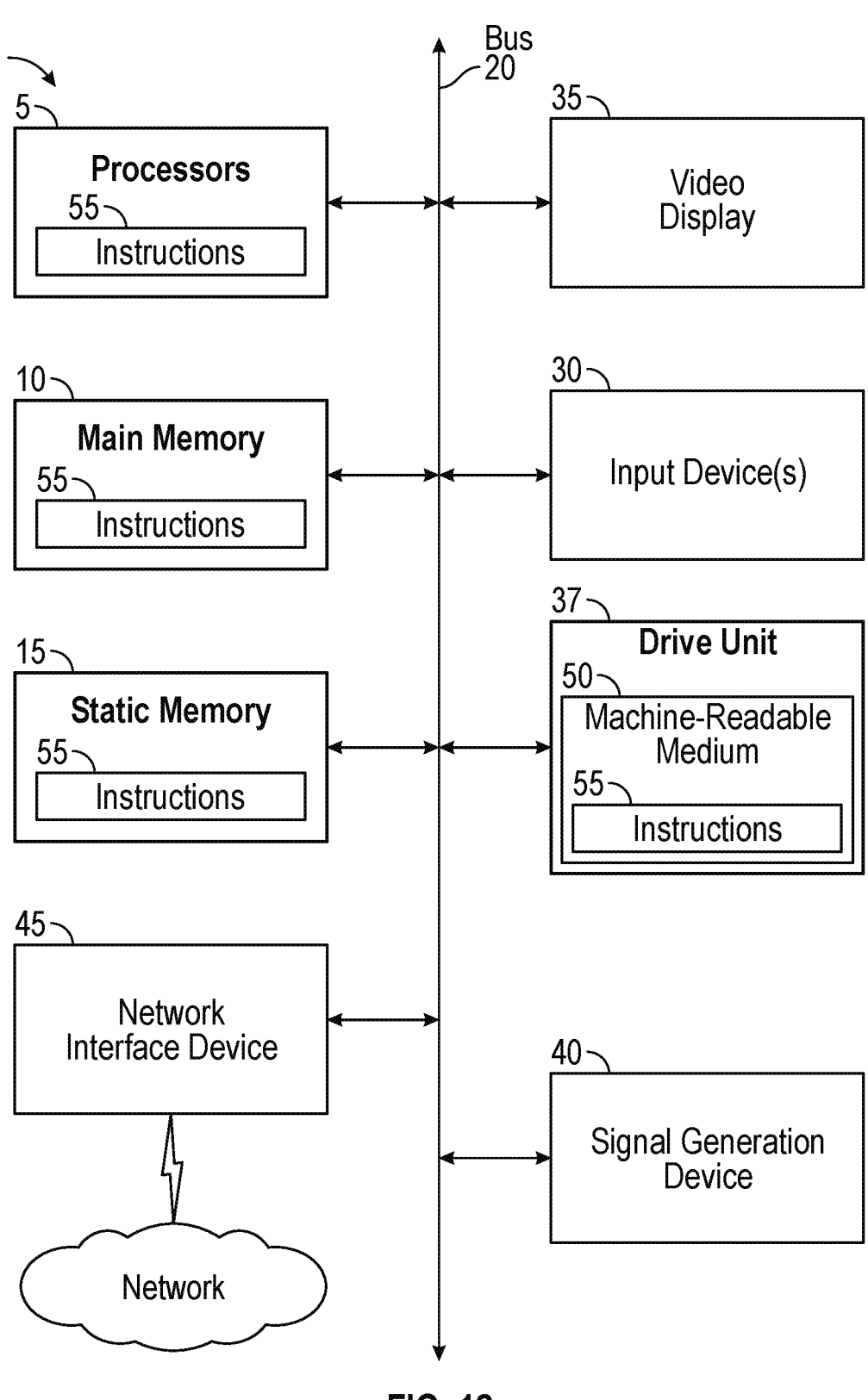
FIG. 12 is a simplified block diagram of a computing system, in accordance with some embodiments.

FIG. 12 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction.

For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

Rapid Bulk Recovery

The present disclosure further provides for embodiments that implement rapid bulk recovery of files that are affected or associated with a malicious event. The rapid bulk recovery of files addresses several problems when manual review of files by an administrator is required.

For instance, as previously described herein as in FIG. 10, the system can detect a malicious event, e.g., a cyberattack, a ransomware attack or a destructive attack where a user account or a machine address removes/deletes files or otherwise manipulates files. Upon detecting a malicious event, the system lists all the files that were affected or associated with the malicious event. The objective is then to remove the destroyed or manipulated file and replace it with a known "good" file that existed prior to the malicious event. Also, as described earlier herein and specifically as set forth in FIG. 10, based on certain information analyzed by the system, the system identifies a list of all the files that were associated with the malicious event. The system then provides a graphical user interface that allows for the restoration of the files from the immutable backup copy of the file system, so that files are restored as requested, as described earlier herein and depicted in FIG. 10.

Using the method as earlier described in FIG. 10, the administrator is required to manually select which files to remove (because they were destroyed or manipulated) and which files should be recovered from the immutable snapshot. Manual selection of files by an administrator, particularly when the files are numerous, can be time-consuming and inefficient. In other words, the longer the downtime, the longer is the time period during which the system is unable to provide users with the right version of data. In other words, users suffer data availability issues, when manual selection of files that are associated with the malicious event is required.

Thus, ideally, it is best to recover from a malicious event or incident as quickly as possible, such that the recovery time objective (RTO) is as low as possible. With this in mind, in some embodiments, a rapid bulk recovery process is key to keeping RTO as low as possible, since the rapid bulk recovery process can rapidly return the file system to the pre-attack state more quickly than if an administrator had to manually review multiple different versions of the numerous files in order to correctly restore the files that were affected by the malicious event.

A rapid bulk recovery process refers to the system's ability to identify which files associated with the malicious event to remove and which files to restore, generate recommendations for an administrator regarding these files, and present a graphical user interface that displays the system's recommendations. With a couple of button clicks, the administrator can respond to the system's recommendations, thereby initiating the removal and/or recovery of the one or more files that are associated with the malicious event.

FIG. 13 is a flowchart of an example method 1300 of the present disclosure for providing cybersecurity active defense and rapid bulk recovery. The method 1300 can be performed by a system, such as the exemplary systems depicted in FIGS. 1 and 12. The method 1300 can include a step 1302 of installing or enabling a microservices architecture on a file system. As noted previously, the microservices architecture is configured to protect the file system in a zero trust manner from a malicious attack by a source system. The method 1300 can also include a step 1304 of determining file-level operations of files in the file system that are indicative of a malicious event.

The method 1300 further includes a step 1306 of blocking a user account or machine address interacting with the files, as well as a step 1308 of preventing data exfiltration or data corruption of the files. According to some embodiments, the method 1300 can include as step 1310 of providing an alert to an administrator regarding the files.

The method 1300 includes a step 1312 of placing snapshot holds on immutable snapshots so that files that have been modified or deleted can be recovered to prior versions and snapshots are available. The method 1300 also includes a step 1314 of identifying the files that were associated with the malicious event.

Also, the method 1300 provides a step 1316 of generating recommendations regarding the files that were associated with the malicious event, based on datapoints of the files and the file-level operations on the files. As used throughout the present disclosure, the term "datapoint" may be any information or aspect about a file. For instance, a datapoint can be any discrete information about the contents of a file, a parameter of the file, or it can be information of a file operation that is performed on the file. In some embodiments, the datapoints include a client IP address associated with a file operation, an account security identifier (SID) or username associated with the file operation, a file time stamp, and a file operation type. In some embodiments, for each file operation, the system captures the client IP address and an account SID or username that was associated with a file operation. The system may also capture a file time stamp associated with the file operation. A file operation type may be a read operation, an open operation, a write operation, a delete operation or any other allowable operation by the file protocol. The file operation type can be determined by the system (such as the system depicted in FIG. 1)

In further embodiments, the datapoints of a file that are the basis of the generating of recommendations include, but are not limited to one or more of a file path, a file name, an operation offset and size, a destination file name (for renaming), a protocol, a per-file detection timestamp derived from replay, a file creation timestamp, a file modification timestamp, contents from the active file system, changes in the file contents that are retained snapshots (rolling and periodic) taken prior to a detection of a malicious event or attack, and any combination thereof.

The recommendations generated by the system (such as the BSP system described earlier herein and depicted in FIG. 1) may include recommendations about which files should be removed from the active file system, as well as recommendations as to which files and file versions should be restored or recovered from the immutable snapshots of the file system.

In some embodiments, the recommendations generated by the system include a recommended list of the one or more files to be deleted from the file system. In other embodiments, the recommendations include a recommended list of the one or more files to be restored from the immutable snapshots of the file system. In yet further embodiments, the recommendations include both a recommended list of the one or more files to be deleted from the file system and a recommended list of the one or more files to be restored from the immutable snapshot of the file system. Further details about these system recommendations will be provided later herein.

In some embodiments, the method includes a step 1318 of presenting a graphical user interface (GUI) that displays the recommendations to the administrator regarding the files that were associated with the malicious event. Based on the administrator's user input via the GUI in response to the system recommendations, removal of one or more of the files from the active file system, and/or restoration of one or more of the files from an immutable backup copy of the file system or snapshot, is allowed. In some embodiments, the administrator's user input to the system recommendations is input by way of a single click or a couple of clicks via the GUI. Then, at step 1320, removal or restoration of the one of more of the files occurs, as requested by the administrator via the presented GUI.

Exemplary GUIs that may be presented to the administrator in step 1318 will be described later herein, including the GUIs provided in FIGS. 14-20. Specifically, in some embodiments, the GUI includes a new incident dashboard that displays a number of incidents that are open, a number of incidents that are unacknowledged, and a number of incidents that were recently closed. An example of a new incident dashboard is provided in FIG. 16, which will be described in greater detail later herein.

In other embodiments, the GUI provides a combined bulk recovery list. The combined bulk recovery list includes recommendations of the one or more files to be deleted from the file system and recommendations of the one or more files to be restored from the immutable backup copy of the file system. An example of a GUI having a combined bulk recovery list is provided in FIG. 18, which will also be described in greater detail later herein.

In yet other embodiments, the administrator is presented with a GUI that provides a divided view. The divided view includes a first view and a second view. The first view is configured for receiving the administrator's user input requesting a restoration of the one or more files from the immutable backup copy of the file system or snapshot. The second view is configured for receiving the administrator's user input requesting a deletion of the one or more files from the file system. Examples of a GUI having a divided view are provided in FIGS. 19 and 20, which will also be described in greater detail later herein.

It will be understood that the order of the steps disclosed in the various methods herein are not intended to be limiting, unless specifically claimed as such. Thus, various steps can be omitted or their order of operations rearranged as would be apparent to one of ordinary skill in the art.

In some instances, the method 1300 includes determining a real-time stream of user activity related to the file system, which captures datapoints of files, including an identity, a client/source IP address, and a protocol. In other instances, the method 1300 includes performing AI-based replays and conducting re-analyses of existing data by assessors for heuristic learning. In some embodiments, the method 1300 further includes utilizing real time parallel stream analysis so that client activity and security analysis operations occur concurrently.

In some embodiments, the system analyzes the files by inspecting and determining the last time a given file was modified, and also determining who modified the file. In other words, the system determines whether a suspected compromised account or attacker modified the file. Thus, the system determines which user or IP address accessed or otherwise modified a file, and then the system analyzes what happened to the file by reviewing what was modified in the file.

In some embodiments, the system looks back and reviews a previous version of a file that the system holds in an immutable snapshot. In other words, the system keeps snapshots, in order to inspect and determine which version(s) of a file exist and which version was the last one in time prior to the malicious event or attack. A threshold can be set by a system user or administrator, so that the system will inspect all the versions of a file that were stable for the time period set by the threshold (typically one minute or five minutes) before the time that the malicious event or attack occurred or the time that the malicious event was detected. With this information, the system can analyze and make recommendations to the administrator as to whether a file should be removed from the active file system or recovered/restored from the immutable backup copy of the file system.

The system may generate a list of all the files that are older than a given threshold (where the threshold can be one minute, 5 minutes, or any period of time) and then the system will present all the versions of those files in a GUI to the administrator. By default, the system reviews snapshots that are 5 minutes and older (based on a 5-minute threshold). That being said, the threshold can be changed from 5 minutes to 1 minute and then the system will re-analyze which files were changed around the time of the malicious event or attack.

In some instances, the system inspects, reviews or otherwise analyzes the name or IP address of a user account that accessed/modified a file, the dates and times that the file was modified, and details of the malicious event.

As previously described, the BSP system (100 of FIG. 1) implements a number of features in order to provide a robust cyberattack active defense. One such feature is known as the recovery and recommendation engine. The recovery and recommendation engine is essential for the rapid bulk recovery process, which is described in greater detail as the exemplary method 1300 of FIG. 13.

As one skilled in the art would know, certain attack types require multiple file operations to detect that a malicious event or attack is occurring, due to the methods and algorithms of the malicious event or attack. That is, some ransomware, excessive delete attacks, and overwrite attacks can take time for AI and heuristics to detect, block, and hold immutable snapshots.

In order to address this problem, the BSP system captures all the file events (that is, the raw activity) which is recorded, audited and analyzed by the different assessors in parallel. As mentioned earlier herein, the BSP system 100 proactively protects unstructured data in the file storage system 108 using inline real time assessors that look for or detect malicious and abnormal file activity conducted by a user or an application.

Once an attack is detected, the BSP system replays all the audited activity through an analyzer or assessor in a mode where an attack has been set to true. The assessors and AI algorithms look through or analyze the raw data again, to ensure that all malicious events are detected. The analyzer or assessor of the BSP system (such as the assessor 125 as depicted in FIG. 1) uses data derived from this replay, in order to generate recommendations to the user/administrator through the bulk recovery screens in a graphical user interface as to which files should be restored and which files should be removed. Exemplary GUIs depicting the bulk recovery screens are provided later herein.

As previously discussed, recommendations by the system are based on multiple datapoints. Specifically, exemplary datapoints that the recovery and recommendation engine of the system may use, in generating and providing bulk removal and restore recommendations to the administrator through a GUI, include but are not limited to the following:

File Event Records—Each with Client IP address, Account SID/username, File Operation Type (Ex:Read, Open, Write, Delete), File Path, File Name, Operation Offset and Size, Destination File Name (for rename), Protocol, Operation Timestamp Per-file detection timestamp by an analyzer or assessor. The per-file detection timestamp is calculated by looking at multiple file event records per file by the replay of raw data, to determine a single detection timestamp for each file. There are also other metadata associated with file operations.

File creation/modification timestamps and contents from the active file system

Changes in file contents retained in snapshots (rolling and periodic snapshots) which were taken prior to a detection of the malicious event by the system Consideration of files that may have already been recovered out of band One or more of the datapoints listed above may be used by recovery and recommendation engine of the system to generate and provide bulk removal and restore recommendations, as described in greater detail earlier herein regarding step 1316 of FIG. 13.

In some embodiments, the datapoints are collectively used to ensure that each file is restored to a last known "good" version captured in snapshot(s) taken prior to the file system being infected. This minimizes the loss of legitimate changes to files that were made just prior to the malicious event or attack. Audit records may be kept indefinitely by the system with the associated file data.

The active defense system described herein also uses custom AI models called assessors (see, for example, assessors 125 of FIG. 1). As new assessors are added to the active defense system, they can replay and re-analyze existing data to learn from prior attacks and leverage for future detection. In other words, in some embodiments, the system includes assessors for performing AI-based replays and conducting re-analyses of existing data for heuristic learning about detection of malicious events.

The active defense system also uses real time parallel stream analysis to allow both client activity and security analysis operations to happen concurrently. The active defense system includes a real time parallel stream analysis module to implement this. The real time parallel stream analysis is a significant advantage over an inline processing approach. This is exponentially advantageous over an external store and forward approach (i.e., callbacks to external systems, log shipping to a SIEM), which would slow down and negatively impact client data activity. Real time stream analysis is accomplished by splicing (which is also called tapping or teeing) metadata elements from live activity into a stream processor of the system, which then uses a shared memory architecture to allow internal but disparate processes to analyze streams in parallel and independently make decisions based on their own AI models. Results are concurrently and continuously aggregated and into an incident workflow upon malicious activity detection.

As mentioned earlier, the BSP system captures all the file events (that is, the raw activity) which is recorded, audited and analyzed by the different assessors in parallel. With the raw record format, the BSP system can store data effectively and the raw record format can be used for training data in long term analysis. In other words, the system can collect raw activity up front, and then analyze data after the malicious attack has occurred, in order to replay raw activity through the analyzer or assessor, knowing that there has been an attack. The system will review or look at prior snapshots to determine what are the best files to recover. Furthermore, the system will perform an AI-based replay after a known malicious attack to determine which files to recover. The system can also store event data indefinitely in an efficient record format.

One of the parallel streams for client activity aggregates, processes and transforms data into file activity records which are stored on a non-volatile media in files grouped by access times and stored in a binary encoded format optimized for streaming from physical media. A processed activity database of the BSP system maintains an on-disk index of activity fields, and an additional in memory record locator index, such that any record or collection of records can be quickly accessed without directly reading the individual activity files themselves. For example, activity files will normally have millions of records, but the composite on-disk plus in memory index allows those millions of records to be processed in seconds with low memory footprint. New records are appended to the end of files that are bucketed by day. The database supports parallel readers while a writer appends new records.

The readers use a highly optimized record decoder that reuses memory when processing each record to minimize per record memory allocations. In many cases, processing each record does not require any additional memory allocations. When analyzers or assessors (such as the assessors 125 of FIG. 1) need to retain specific metadata for historical analysis, the memory required is deduplicated with history stored prior. This allows analyzers to process operations and maintain a low memory footprint. By not allocating per record memory the application does need to spend CPU cycles detecting and releasing unused memory.

The writer appends records to the end of files that have been organized and bucketed by day. Multiple file operations are merged into a single record to reduce overhead when the individual operations are contiguous and not mixed with other operations to the same file. This can result in a single record when a client reads a large file that requires multiple contiguous read operations to complete. The database maintains an index of metadata about each day and records within each file including operation counts and timestamp range. This enables files to be skipped based on timestamp criteria when processing historical data. Processed activity files are fully transportable and are not distinct to the source system.

In further embodiments, the system provides a dashboard which that illustrates two types of incidents, namely, notifications for unusual events and for actual attacks. As a result, the dashboard provides incident bifurcation. Unusual events are anomalous behavior, such as the use of a weak protocol or other potentially interesting behaviors. The system will auto-remediate and close these notification incidents after 24 hours. Attack incidents are for activities where an attack event is detected. These events will not auto-remediate and must be managed by a system administrator.

The system also includes an improvement of an assessor/analyzer (such as the assessors 125 of FIG. 1) in that the sensitivity level for the analyzer can be adjusted. Valid settings are "normal," "reduced", "low" and "off". This can be used during initial deployment, or when the usage of the system has changed, to reduce false positives and prevent disruption of service to the clients. Instead of blocking users, only a notification incident would be created, which provides awareness to the administrator for any custom rules that will need to be created for typical activity under the "normal" sensitivity.

In addition, active defense can be suspended on a dataset for a period of time, if there will be known activity which should not be saved or analyzed, such as a bulk data load. This can be scheduled in advance with a start and end time. Generic exfil ransomware assessor (also known as extortionware) analyzes the pattern of activity that exfiltrates files and leaves a ransom note. A custom assessor is not required for each type of extortionware.

The processed activity database records from many systems (sources) can be aggregated together on a third system(s) to allow for continuous recursive training of the active defense assessor models. The recursive training and analysis (RTA) comprises one or more services which perform the aggregation and storage of processed activity, and provide an interface (API) for other components of the active defense services to on-demand query, re-train, and improve their decision models based on lifetime client activity. The UB store is for a persistent record of activity that can be searched and reviewed. It is also used for incident recovery and reporting.

The system also can turn off activity collection per dataset, which eliminates unnecessary records and provides better efficiency by eliminating records which do not need to be analyzed or saved, which in turn equates to records collection and analysis efficiency. The administrator can disable the analyzer from processing certain folders and file name patterns.

Client activity can come into the system at a higher rate than active defense can consume the activity records. Normally the entire service runs at full speed, but when it detects that it is falling behind, it applies backpressure which propagates back to the clients and slows down incoming activity. This dynamically adjusts until equilibrium has been achieved. Once the load has slacked off, the system dynamically adjusts to return to full speed. This applies to any client protocol such as NFS or SMB. The active defense system does not run in-line with protocol handling. This allows the protocols to run at full speed while the system sits on the side to analyze the records. Latency is not added since the system provides the analysis out of band but can still apply backpressure when necessary.

Figure 14:
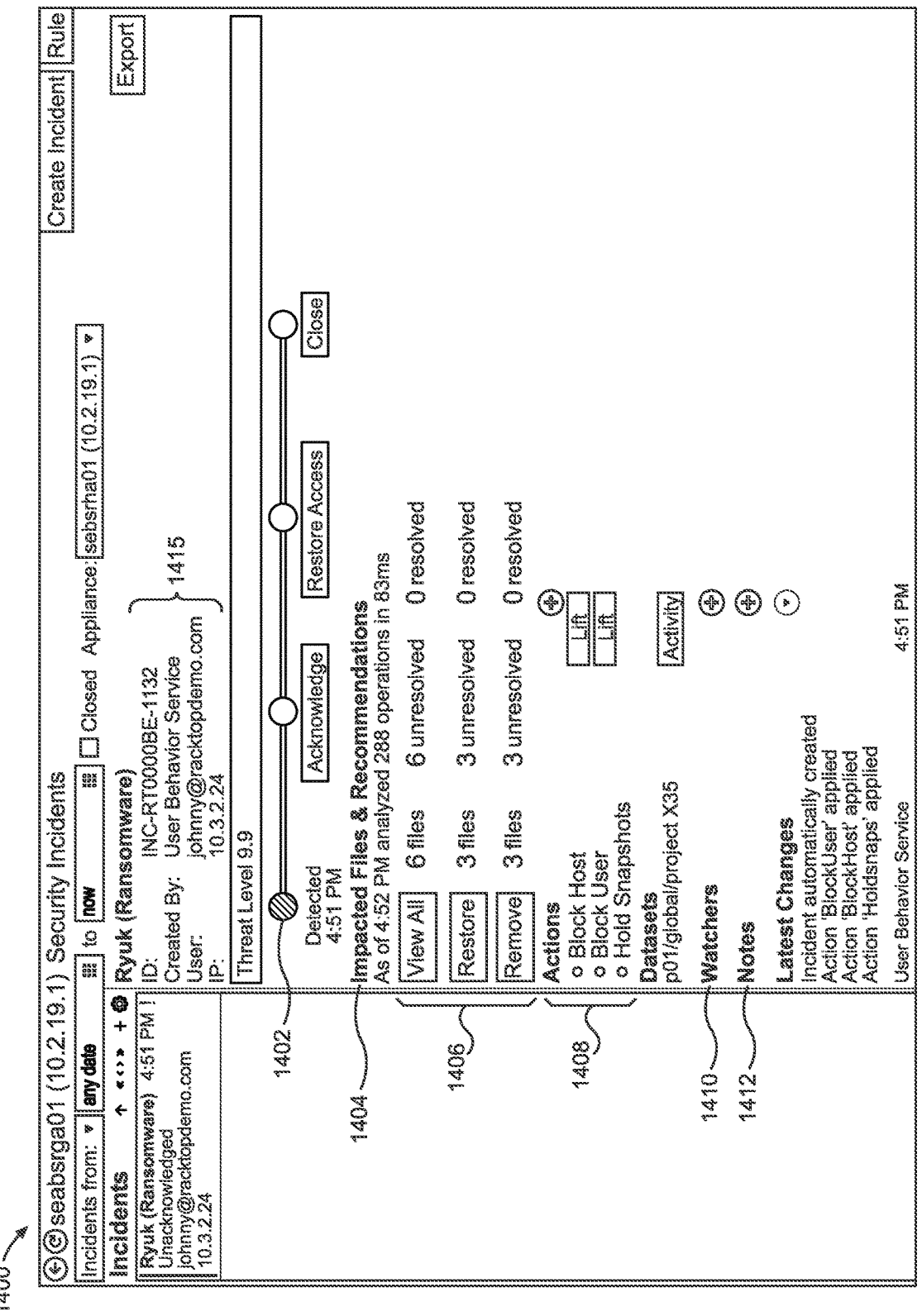

Referring now to FIG. 14, FIG. 14 depicts a screenshot of an exemplary graphical user interface (GUI) 1400 concerning a security incident (also known herein as an incident). FIG. 14 indicates that the security incident is a ransomware incident, and a timeline 1402 is shown regarding the status of the security incident. Based on the timeline 1402, FIG. 14 illustrates that the security incident was detected at 4:51 pm. Still referring to the timeline 1402, the timeline 1402 further indicates that the security incident has not yet been acknowledged, access has not yet been restored, and the security incident has not yet been closed.

The GUI 1400 also includes an impacted files and recommendations section 1404, which in the example provided in FIG. 14, indicates that there are six total unresolved files. Specifically, the impacted files and recommendations section 1404 shows how many total files were affected in the security incident, how many files need to be restored from a snapshot, and how many files should be deleted from the active file system. Once the rapid bulk recovery process is complete, the impacted files and recommendations section 1404 will show that all the files are resolved.

Figure 15:
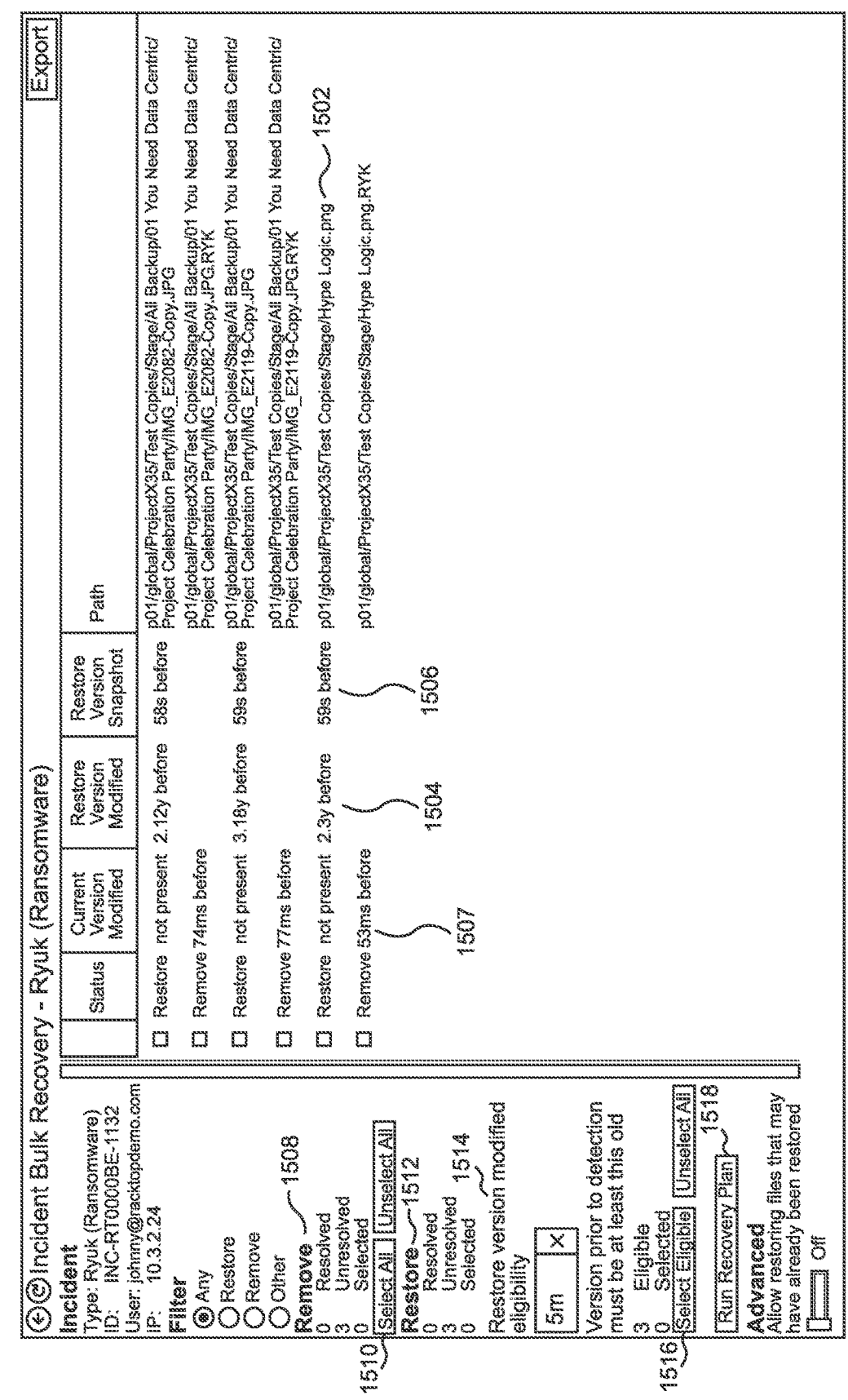

Still referring to the example provided in FIG. 14, for those six total unresolved files, in the recommendations in the impacted files and recommendations section 1404, the system recommends restoring 3 files and removing 3 files of the six total unresolved files. The recommendations generated by the system are part of the rapid bulk recovery process described herein. As explained earlier, the recommendations are based on particular datapoints of the files associated with the malicious event (in this case, the ransomware attack). The system has determined that the 3 files recommended to be removed 1406 based on the datapoints and analysis of the assessor. The user can click on the View All button in 1406 to get to a view of GUI 1500 (FIG. 15). The datapoints in this incident shown in FIG. 15 shows that three files were overwritten in less than a second prior to incident discovery, and that these files were overwritten from file operations performed by the same user, 1415 johnny@racktopdemo, and client IP, 10.3.2.24. FIG. 15 shows the three specific files that are recommended to be removed, which in this case are the renamed and encrypted versions of the previous files. To fully recover from the incident, the GUI 1500 shows files that it recommends restoring to replace the encrypted version of the file, the file manipulated in the attack. The system implicated these files with file operations in the attack with the user account, client IP, file operations on the files, and the timestamp for the events. For example, one of the three files GUI 1500 recommends for file restoration shows that the recommended version to restore for file Hype Logic.png 1502 had not been modified for 2.3 years (shown in the restore version modified field 1504) before the cyberattack incident. This means the version of the file was stable for well over 5 minutes prior to the attack (shown in the drop-down menu 1514). The GUI 1500 shows the user that version of the file is available in the snapshot from 59 seconds prior to the incident (shown in the restore version snapshot field 1506) and recommends that the user restores that version of the file from that snapshot to the live file system. This will restore the file to the pre-attack version of the encrypted file.

The GUI 1400 also includes an actions section 1408, by which an administrator can block or unblock a host, block or unblock a user, or hold snapshots. The GUI 1400 also provides a means for an administrator to add watchers 1410 who will be notified about the latest changes in and actions for the incident. Furthermore, the GUI 1400 includes a notes section 1412, in which a person managing the security incident can add notes. Finally, the GUI 1400 includes a section that shows the latest changes and actions for the incident, which will be sent via webhooks and to the watchers 1410 as changes and actions occur.

FIG. 15 depicts a screenshot of an exemplary GUI 1500 of bulk recovery in response to the security incident described in exemplary GUI 1400 of FIG. 14. Still referring to FIG. 15, the GUI 1500 shows a list of six total unresolved files (which were mentioned in the description of FIG. 14). The GUI 1500 also provides specific details of each of those six unresolved files, including a file path. Referring now to the fifth unresolved file provided in the list of files depicted in the GUI 1500, the system shows a recommendation of "Restore" and the GUI 1500 further shows a restore version modified field 1504 of "2.3y before". In other words, the restore version modified field 1504 shows that this particular file was not modified for 2.3 years before the incident. Also, the GUI 1500 provides a restore version snapshot field 1506, which for this particular file shows that the file was changed 59 seconds before the incident was detected. These two file modification timestamps provided in the restore version modified field 1504 and the restore version snapshot field 1506 are datapoints that the system uses in generating the recommendation that this particular file be restored from the immutable backup copy of the file system.

The GUI 1500 also shows that for the last file provided in the list of six total unresolved files, the system provides a recommendation 1507 of "Remove 53 ms before." This means that for this last file, Hype Logic.png.RYK, the system recommends removing the file that is present on the live file system and was modified 53 milliseconds before the system detected the malicious event and opened an incident.

The GUI 1500 also includes Remove section 1508 and Restore section 1512. The Remove section 1508 indicates how many files recommended for removal from the active file system are resolved, unresolved and selected by the administrator. The Remove section 1508 also includes a Selection all button 1510, which allows the administrator to select all the files recommended by the system to be removed from the active file system. In this case, those files recommended for removal are encrypted ones. Similarly, the Restore section 1512 indicates how many files recommended for restoration are resolved, unresolved and selected by the administrator.

The GUI 1500 also has a drop-down menu 1514 whereby the administrator can set a threshold based on time. In the GUI 1500, the drop-down menu 1514 currently shows 5 m which refers to a threshold of 5 minutes. In other words, by setting the threshold to 5 minutes, the system will analyze and provide a list of all versions that were modified more than five minutes before the security incident occurred or was detected. It will not recommend any file versions within 5 minutes of incident detection for restoration. The threshold can be changed from 5 minutes to other thresholds, such as 1 minute or 10 minutes.

The GUI 1500 includes a Select Eligible button 1516. If the Select Eligible button 1516 is clicked, the system will select the files and the versions of those files recommended to restore from the snapshots. The GUI 1500 further includes a Run Recovery Plan button 1518. When clicked, this single Run Recovery Plan button 1518 will cause the system to run a recovery plan, which will restore and remove selected files.

Figure 16:
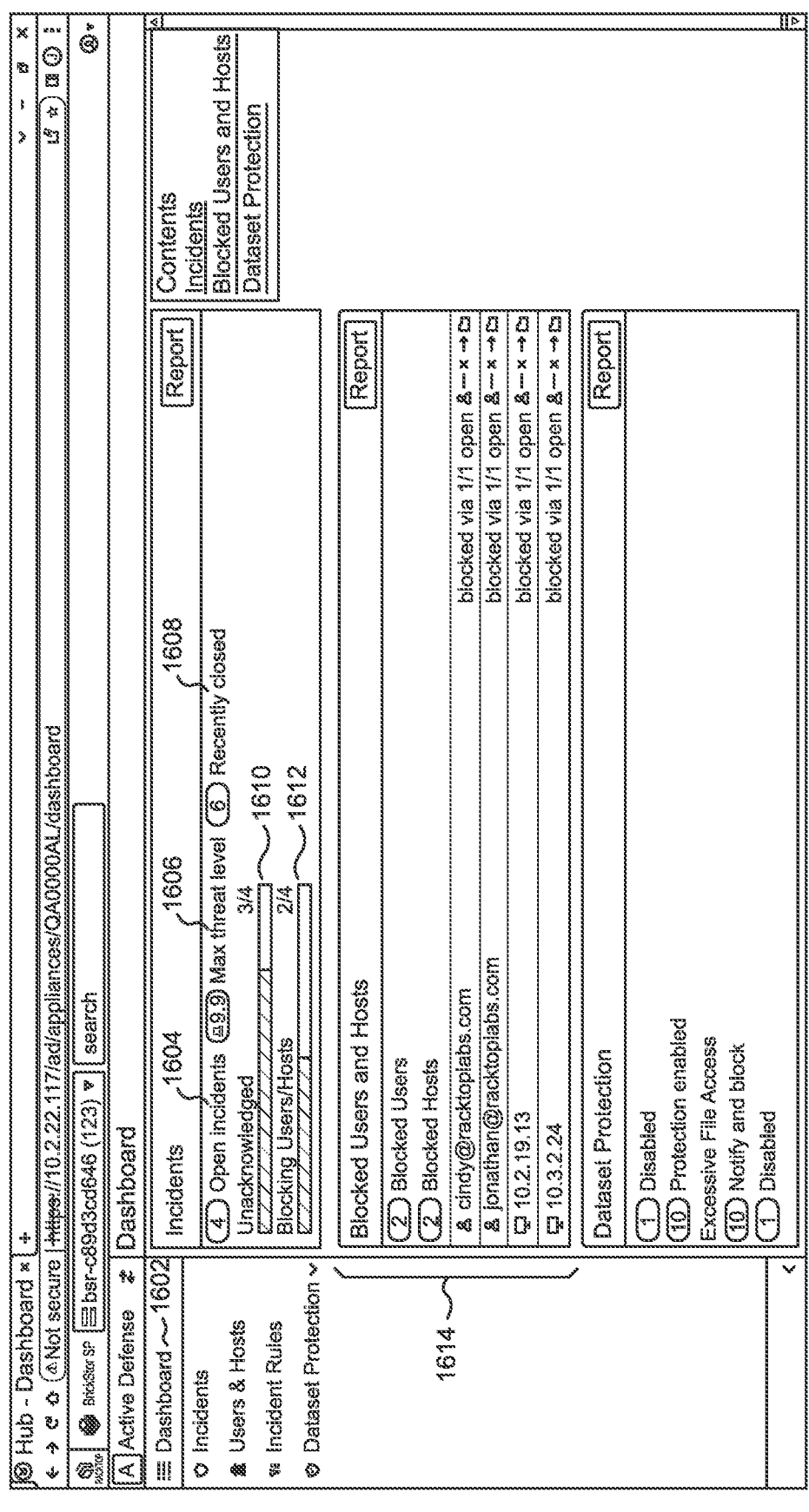

FIG. 16 depicts an exemplary GUI 1600 which includes a new incident dashboard that displays a number of incidents that are open, a number of incidents that are unacknowledged, and a number of incidents that were recently closed. This dashboard is provided when the Dashboard tab 1602 is selected. An open incidents field 1604 of the GUI 1600 provides the number of incidents that are open. A max threat level field 1606 indicates the level of the maximum threat provided by the incidents. A Recently closed field 1608 provides the number of incidents that were recently closed. An Unacknowledged progress bar 1610 shows the number of incidents that are acknowledged. Specifically, in the example provided in the GUI 1600, the Unacknowledged progress bar 1610 shows that 3 of 4 open incidents are unacknowledged. Further, a Blocking Hosts/Users progress bar 1612 shows how many hosts or users are currently being blocked. In the example provided in the GUI 1600, the Blocking Hosts/Users progress bar 1612 shows that 2 of 4 hosts/users are currently being blocked. The specific blocked hosts/users are detailed in the Blocked Users and Hosts section 1614 of the GUI 1600.

Figure 17:
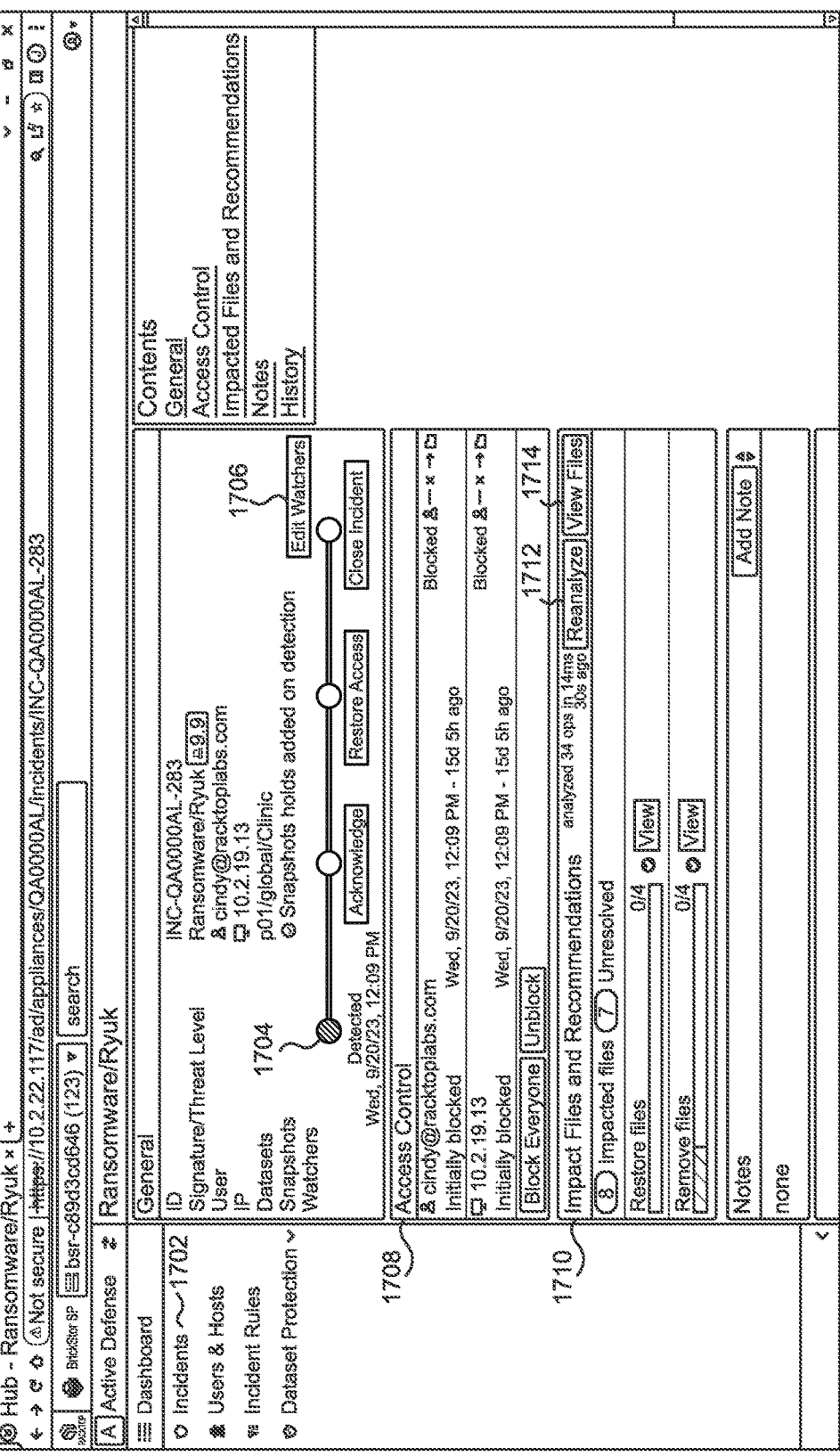

FIG. 17 depicts an exemplary GUI 1700, which illustrates a new incident management page that is provided when the Incidents tab 1702 is selected. FIG. 17 indicates that the security incident is a ransomware incident, and a timeline 1704 is shown regarding the status of the security incident. Based on the timeline 1704, FIG. 17 illustrates that the security incident was detected at 12:09 pm on Wednesday, Sep. 20, 2023. Still referring to the timeline 1704, the timeline 1704 further indicates that the security incident has not yet been acknowledged, access has not yet been restored, and the security incident has not yet been closed.

The GUI 1700 includes an edit watchers button 1706 which allows an administrator to edit a list of watchers that are notified of the latest changes and actions in the incident. The GUI 1700 also includes an Access Control section 1708, which details which users and/or hosts were blocked by the system. The Access Control section 1708 also includes buttons that allow the administrator to block or unblock everyone listed in the Access Control section 1708.

The GUI 1700 also includes an impacted files and recommendations section 1710, which in the example provided in FIG. 14, indicates that there are 8 impacted files (files that were impacted by the incident) and 7 files that remain unresolved. Specifically, the impacted files and recommendations section 1710 shows how many total files were affected in the security incident, how many files are recommended for restoration from a snapshot, and how many files are recommended for deletion from the active file system. Once the rapid bulk recovery process is complete, the impacted files and recommendations section 1710 will show that no files remain unresolved (that is, all files are resolved).

The impacted files and recommendations section 1710 further includes a Reanalyze button 1712, which when clicked will cause the system to reanalyze the raw data as described herein and generate recommendations regarding the impacted files. The impacted files and recommendations section 1710 also includes a View files button 1714, which when clicked will cause the system to display the impacted files to the administrator.

FIG. 18 depicts a GUI 1800 that includes a combined bulk recovery list. The combined bulk recovery list is provided in an overview 1802, which lists the number of files recommended by the system for deletion and provides the number of files recommended for restoration. The overview 1802 also provides buttons for the administrator, in order to respond to the recommendations generated by the system.

The administrator may click one of the two Select Recommended buttons, which will cause the system to select the recommended files for either deletion or restoration. Likewise, the administrator may click on the Remove Selected or Restore Selected buttons, which will cause the system to remove or restore the selected files, respectively.

The GUI 1800 further includes a Reanalyze button 1804, which when clicked will cause the system to reanalyze the raw data as described herein and generate recommendations regarding the impacted files. The GUI 1800 also includes a View incident button 1806, which when clicked will cause the system to display the incident dashboard (such as the dashboard depicted in FIG. 16) to the administrator.

Finally, the GUI 1800 provides a list of impacted files 1808, including recommendations and details of certain files to be deleted from the file system, as well as recommendations and details of certain files to be restored from the immutable backup copy of the file system.

Figure 19:
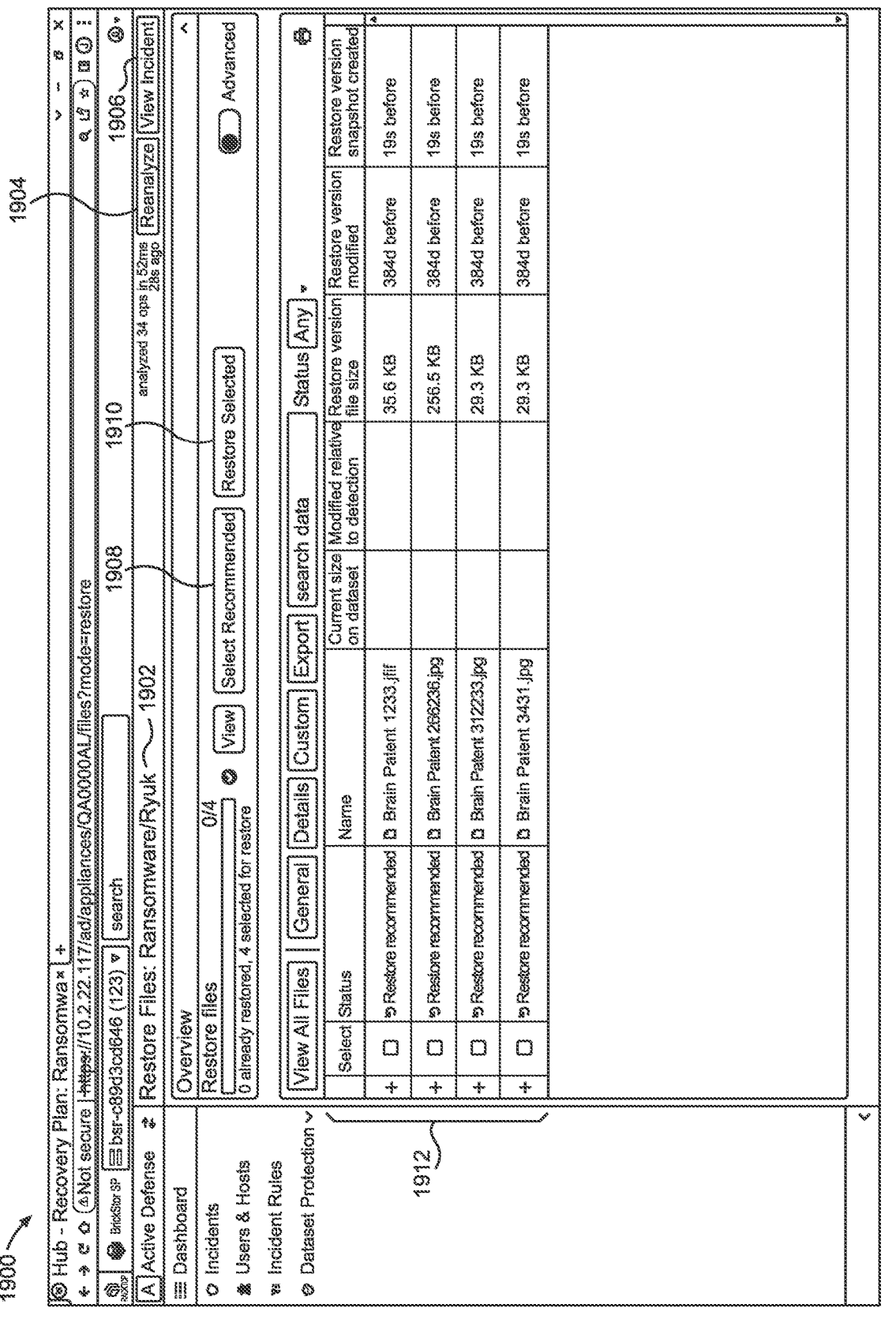
Figure 20:
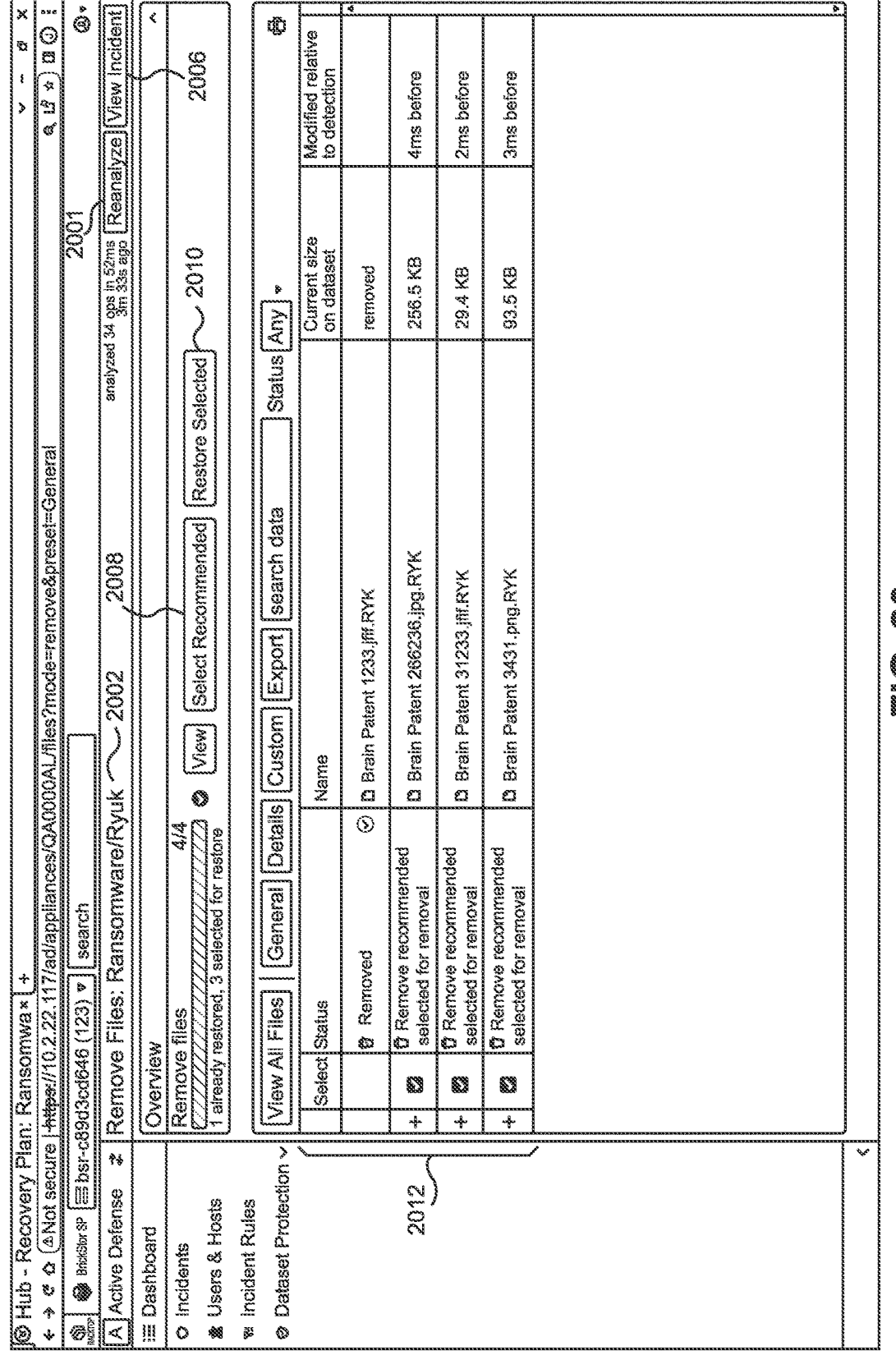

FIGS. 19 and 20 collectively depict GUIs 1900 and 2000 that offer a divided view to an administrator. The divided view includes at least a first view and a second view. The first view is configured for receiving the administrator's user input requesting a restoration of the one or more files from the immutable backup copy of the file system or snapshot. The second view is configured for receiving the administrator's user input requesting a deletion of the one or more files from the file system. In other words, the view has been divided in FIGS. 19 and 20, such that the administrator can request the system to perform restorations in the first view and the administrator can request the system to perform deletions in the second view. The administrator can switch from the first view to the second view and vice versa, for more control.

Specifically, in FIG. 19, the GUI 1900 provides a first view for restoring files as shown by a Restore Files header 1902. The GUI 1900 further includes Select Recommended button 1908, which will cause the system to select the recommended files for restoration. The administrator can click on the Restore Selected button 1910, which will cause the system to restore the selected files. The GUI 1900 further includes a Reanalyze button 1904, which when clicked will cause the system to reanalyze the raw data as described herein and generate recommendations regarding the impacted files. The GUI 1900 also includes a View incident button 1906, which when clicked will cause the system to display the incident dashboard (such as the dashboard depicted in FIG. 16) to the administrator. The GUI 1900 provides a list of files recommended for restoration 1912, including details of the files to be restored from the immutable snapshot of the file system.

In FIG. 20, the GUI 2000 provides a second view for removing files as shown by a Remove Files header 2002. The GUI 2000 further includes Select Recommended button 2008, which will cause the system to select the recommended files for removal. The administrator can click on the Remove Selected button 2010, which will cause the system to remove the selected files from the active file system. The GUI 2000 further includes a Reanalyze button 2001, which when clicked will cause the system to reanalyze the raw data as described herein and generate recommendations regarding the impacted files. The GUI 2000 also includes a View incident button 2006, which when clicked will cause the system to display the incident dashboard (such as the dashboard depicted in FIG. 16) to the administrator. The GUI 2000 provides a list of files recommended for removal 2012, including details of the files to be removed from the active file system.

It will be appreciated that the rapid bulk recovery processes described herein can be implemented utilizing the systems depicted in any of the accompanying figures, including but not limited to FIGS. 1 and 12. With the help of rapid bulk recovery processes, users can rapidly return the file system to the pre-attack state more quickly than if an administrator had to manually review versions of files in order to correctly and efficiently restore the files that were affected by the malicious event.

What is claimed is:

1. A system comprising:

a file system; and an architecture installed on the file system, the architecture being configured to protect the file system in a zero-trust manner from a malicious attack by a source system, the architecture comprising a controller that is configured to:

determine file-level operations of files in the file system that are indicative of a malicious event;

block a user account or machine address interacting with the files over a network;

prevent data exfiltration or data corruption of the files;

provide an alert to an administrator regarding the files;

place snapshot holds on immutable snapshots so that files that have been modified or deleted can be recovered to prior versions and snapshots are available;

identify the files that were associated with the malicious event;

generate recommendations regarding the files that were associated with the malicious event, based on datapoints of the files and the file-level operations on the files, the datapoints comprising a client IP address, an account security identifier (SID) or username, a file time stamp, and a file operation type;

present a graphical user interface (GUI) that displays the recommendations to the administrator regarding the files that were associated with the malicious event and, based on the administrator's user input in response to the recommendations, allows for removal of one or more of the files from the file system and restoration of the one or more of the files from an immutable backup copy of the file system or snapshot, the GUI comprising a new incident dashboard that displays a number of incidents that are open, a number of incidents that are unacknowledged, and a number of incidents that were recently closed; and remove and restore the one or more of the files as requested.

2. The system according to claim 1, wherein the administrator's user input in response to the recommendations comprises a single click via the GUI.

3. The system according to claim 1, wherein the datapoints further comprise one or more of a file path, a file name, an operation offset and size, a destination file name, a protocol, a per-file detection timestamp derived from replay, a file creation timestamp, a file modification timestamp, contents of the active file system, changes in file contents that are retained in snapshots taken prior to a detection of the malicious event or the malicious attack, and any combination thereof.

4. The system according to claim 1, wherein the recommendations include a recommended list of the one or more of the files to be deleted from the file system.

5. The system according to claim 1, wherein the recommendations include a recommended list of the one or more of the files to be restored from the immutable backup copy of the file system or the snapshot.

6. The system according to claim 1, further comprising assessors for performing AI-based replays and conducting re-analyses of existing data for heuristic learning.

7. The system according to claim 1, wherein the GUI further provides a combined bulk recovery list, the combined bulk recovery list providing:

recommendations of the one or more of the files to be deleted from the file system; and recommendations of the one or more of the files to be restored from the immutable backup copy of the file system or snapshot.

8. The system according to claim 1, wherein the GUI provides a divided view, the divided view including a first view and a second view, the first view configured for receiving the administrator's user input requesting a restoration of the one or more of the files from the immutable backup copy of the file system or the snapshot, and the second view configured for requesting a deletion of the one or more of the files from the file system.

9. The system according to claim 1, further comprising real-time parallel stream analysis module that allows for client activity and security analysis operations to occur concurrently.

10. A method comprising:

enabling a microservices architecture on a network-based file system that provides file access to a plurality of users, the microservices architecture being configured to protect the network-based file system in a zero-trust manner from a malicious attack by a source system;

determining file-level operations of files in the network-based file system that are indicative of a malicious event;

blocking a user account or machine address interacting with the files;

preventing data exfiltration or data corruption of the files;

providing an alert to an administrator regarding the files;

placing snapshot holds on immutable snapshots so files that have been modified or deleted can be recovered to prior versions and snapshots are available;

identifying the files that were associated with the malicious event;

generating recommendations regarding the files that were associated with the malicious event, based on datapoints of the files and the file-level operations on the files, the datapoints comprising a client IP address, an account security identifier (SID) or username, a file time stamp, and a file operation type;

presenting a graphical user interface (GUI) that displays the recommendations to the administrator regarding the files that were associated with the malicious event and, based on the administrator's user input in response to the recommendations, allows for removal of one or more of the files from the file system and restoration of the one or more of the files from an immutable backup copy of the file system or snapshot, the GUI further providing a combined bulk recovery list, the combined bulk recovery list providing:

recommendations of the one or more of the files to be deleted from the file system; and recommendations of the one or more of the files to be restored from the immutable backup copy of the file system or snapshot; and removing and restoring the one or more of the files as requested.

11. The method according to claim 10, wherein the administrator's user input in response to the recommendations comprises a single click via the GUI.

12. The method according to claim 10, wherein the datapoints further comprise one or more of a file path, a file name, an operation offset and size, a destination file name, a protocol, a per-file detection timestamp derived from replay, a file creation timestamp, a file modification timestamp, contents of the active file system, changes in file contents that are retained in the snapshots taken prior to a detection of the malicious event or the malicious attack, and any combination thereof.

13. The method according to claim 10, wherein generating recommendations regarding the files that were associated with the malicious event further comprises generating a recommended list of the one or more of the files to be deleted from the file system.

14. The method according to claim 10, wherein generating recommendations regarding the files that were associated with the malicious event further comprises generating a recommended list of the one or more of the files to be restored from the immutable backup copy of the file system or the snapshot.

15. The method according to claim 10, further comprising performing AI-based replays and conducting re-analyses of existing data by assessors for heuristic learning.

16. The method according to claim 10, wherein the GUI comprises a new incident dashboard that displays a number of incidents that are open, a number of incidents that are unacknowledged, and a number of incidents that were recently closed.

17. The method according to claim 10, wherein the GUI provides a divided view, the divided view including a first view and a second view, the first view configured for receiving the administrator's user input requesting a restoration of the one or more of the files from the immutable backup copy of the file system or the snapshot, and the second view configured for requesting a deletion of the one or more files from the file system.

18. The method according to claim 10, further comprising utilizing real-time parallel stream analysis so that client activity and security analysis operations occur concurrently.

19. A method comprising:

enabling a microservices architecture on a network-based file system that provides file access to a plurality of users, the microservices architecture being configured to protect the network-based file system in a zero-trust manner from a malicious attack by a source system;

determining file-level operations of files in the network-based file system that are indicative of a malicious event;

blocking a user account or machine address interacting with the files;

preventing data exfiltration or data corruption of the files;

providing an alert to an administrator regarding the files;

placing snapshot holds on immutable snapshots so that files that have been modified or deleted can be recovered to prior versions and snapshots are available;

identifying the files that were associated with the malicious event;

generating recommendations regarding the files that were associated with the malicious event, based on datapoints of the files and the file-level operations on the files, the datapoints comprising a client IP address, an account security identifier (SID) or username, a file time stamp, and a file operation type;

presenting a graphical user interface (GUI) that displays the recommendations to the administrator regarding the files that were associated with the malicious event and, based on the administrator's user input in response to the recommendations, allows for removal of one or more of the files from the file system and restoration of the one or more of the files from an immutable backup copy of the file system or snapshot;

removing and restoring the one or more of the files as requested; and utilizing real-time parallel stream analysis so that client activity and security analysis operations occur concurrently.

* * * * *